US009621393B2

(12) United States Patent
Kim et al.

(10) Patent No.: US 9,621,393 B2
(45) Date of Patent: *Apr. 11, 2017

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG Electronics Inc., Seoul (KR)

(72) Inventors: Byounggill Kim, Seoul (KR); Woochan Kim, Seoul (KR); Jaehyung Kim, Seoul (KR); Sungryong Hong, Seoul (KR); Chulkyu Mun, Seoul (KR); Jinyong Choi, Seoul (KR); Jaeho Hwang, Seoul (KR); Jongseob Baek, Seoul (KR); Kookyeon Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,282

(22) Filed: May 12, 2016

(65) Prior Publication Data

US 2016/0261447 A1    Sep. 8, 2016

Related U.S. Application Data

(63) Continuation of application No. 14/157,314, filed on Jan. 16, 2014, now Pat. No. 9,369,325.

(Continued)

(51) Int. Cl.
*H04L 27/26*    (2006.01)
*H04H 20/59*    (2008.01)
(Continued)

(52) U.S. Cl.
CPC ....... *H04L 27/2627* (2013.01); *H04B 7/0413* (2013.01); *H04H 20/59* (2013.01);
(Continued)

(58) Field of Classification Search
CPC ...... H04B 7/0413; H04H 20/59; H04H 20/72; H04J 13/0062; H04L 1/0071;
(Continued)

(56) References Cited

U.S. PATENT DOCUMENTS 8,693,412 B2    4/2014  Jarni et al.
2009/0303913 A1   12/2009  Yu et al.
(Continued)

FOREIGN PATENT DOCUMENTS

EP    2139132 A1    12/2009
EP    2381598 A1    10/2011
(Continued)

OTHER PUBLICATIONS

Digital Video Broadcasting (DVB) Next Generation broadcasting system to Handheld, physical layer specification (DVB-NGH)', DVB Document A160 (2012.11).

*Primary Examiner* — Nader Bolourchi
(74) *Attorney, Agent, or Firm* — Dentons US LLP

(57) ABSTRACT

A method and an apparatus for transmitting broadcast signals thereof are disclosed. The method for transmitting broadcast signals comprises encoding DP (data pipe) data carrying at least one service, mapping the encoded DP data onto constellations, time interleaving the mapped DP data, building at least one signal frame including the time interleaved DP data, modulating data in the built at least one signal frame by an OFDM scheme and transmitting the broadcast signals having the modulated data, wherein the at least one signal frame includes emergency alert information.

8 Claims, 30 Drawing Sheets

Related U.S. Application Data

(60) Provisional application No. 61/753,871, filed on Jan. 17, 2013, provisional application No. 61/754,536, filed on Jan. 19, 2013, provisional application No. 61/809,412, filed on Apr. 7, 2013.

(51) Int. Cl.

| | | |
|---|---|---|
| *H04L 5/00* | (2006.01) | |
| *H04B 7/0413* | (2017.01) | |
| *H04J 13/00* | (2011.01) | |
| *H04L 1/00* | (2006.01) | |
| *H04L 29/06* | (2006.01) | |
| *H04H 20/72* | (2008.01) | |

(52) U.S. Cl.
CPC ........ *H04J 13/0062* (2013.01); *H04L 1/0041* (2013.01); *H04L 1/0045* (2013.01); *H04L 1/0057* (2013.01); *H04L 1/0071* (2013.01); *H04L 5/0007* (2013.01); *H04L 27/2613* (2013.01); *H04L 27/2647* (2013.01); *H04L 65/4076* (2013.01); *H04H 20/72* (2013.01)

(58) Field of Classification Search
CPC ............. H04L 27/2613; H04L 27/2627; H04L 27/2647; H04L 5/0007; H04L 65/4076
USPC ......................................................... 375/295
See application file for complete search history.

(56) References Cited

U.S. PATENT DOCUMENTS

| | | |
|---|---|---|
| 2010/0067514 A1 | 3/2010 | Luo et al. |
| 2011/0131464 A1 | 6/2011 | Ko et al. |
| 2011/0274211 A1* | 11/2011 | Ko .................. H04L 1/0057 375/300 |
| 2012/0039284 A1 | 2/2012 | Barbieri et al. |
| 2012/0147997 A1* | 6/2012 | Nishikawa .......... H04L 27/2613 375/340 |
| 2012/0314786 A1 | 12/2012 | Atungsiri et al. |
| 2013/0039303 A1* | 2/2013 | Stadelmeier .......... H04H 60/07 370/329 |

FOREIGN PATENT DOCUMENTS

| | | |
|---|---|---|
| WO | 2009104931 A2 | 8/2009 |
| WO | 2010031073 A1 | 3/2010 |
| WO | 2011104534 A2 | 9/2011 |
| WO | 2012067362 A2 | 5/2012 |

\* cited by examiner

FIG. 16

| Requirement | Value | Notes | Technologies as solution |
|---|---|---|---|
| Spectral Efficiency | 0.5→10.0 bits/s/Hz | C/N range og 0→31dB with scalable bit rates, i.e. multi-mode | Low coder rate + SC-FDM MIMO for high spectral efficiency |
| Higher Data Rate | 30% data rate increase of payload or mo re) over 19.39268Mbit/sec in 6MHz Cha nnel at 15dB C/N | The system should also improve the reception robustness, e.g., better than 15 dB C/N, for be tter indoor and pedestrian reception. | LDPC provides more than 30%(T2 experience) |
| Maximum Excess BW | <0.115 | Spectral efficiency(depends on mode of opera tion) | 32K-FFT enables guard band ~ 0.02875 |
| Channel Model Tolerance | Listed in table below... | These are some of the channel models to supp ort. Many other fading channel models need to be considered. | To be verified |
| Improved Reliability and Robustness | Robustness to ISI | The new system should be very robust against multipath distortion and should have strong sy stem synchronization capability | Guard interval against ISI |
| SFN | Support large service areas | Tolerate long man-made echoes | SFN configuration confirmed |
| Flexible system | System shall support configurations for di ffering coverage scenarios, topographies and morphologies | Fixed/ portable/ Mobile desvices in Urban/ R ural settings with simultaneous support of UHD and mobile HD services | Use-case based frame multiplexing Service-specific robustness in PHY layer |
| Portable Antenna Support | Robust Reception with scalable bit rates | Layered service support of Ultra-HDTV and mo bile HDTV | Scalable video service supported |
| Return Channel | Unicast IP network | Interactive services equire feedback from use rs | Supported interaction with IP network |
| Emergency Alert System | Fast reporting of emergency alerting(low latency message...more robust service) | EAS is important for public safety | Separate data pipe for EAS |
| Future Extensibility | Allow for independent data pipes (implies block interleaving) | scalability/ extensisons could be possible | Future extension support |
| Long Battery Life | Portable device support | Possible Time diversity to save battery life | Time slicing Decoding of individual data pipe of interest |

16000

16100

16200

FIG. 22
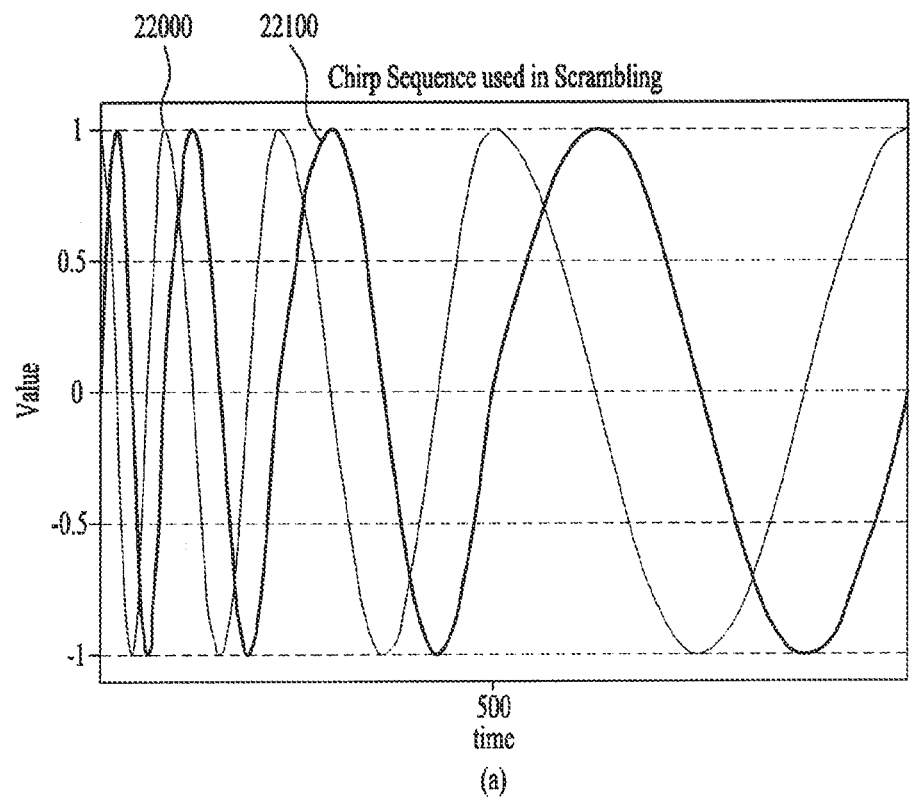
(a)
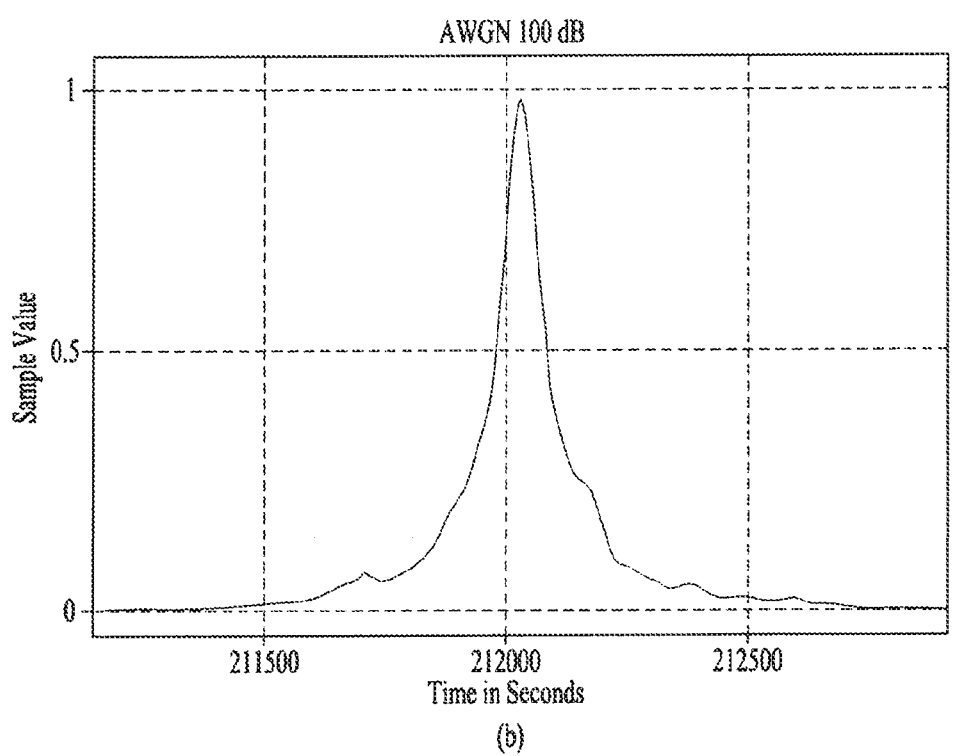
(b)

FIG. 23
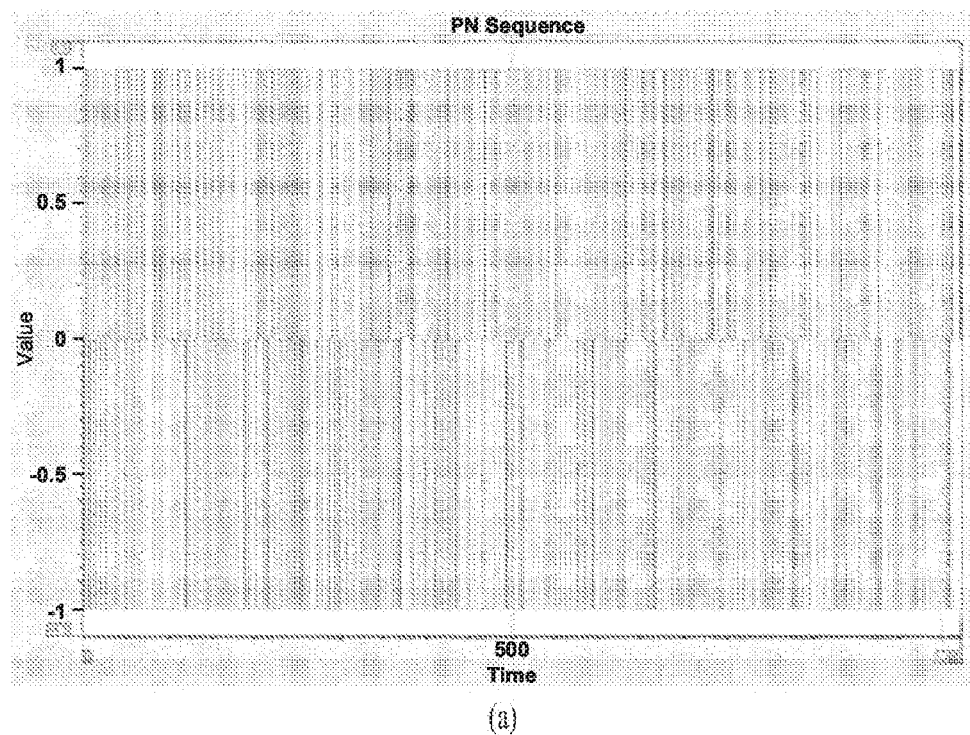
(a)
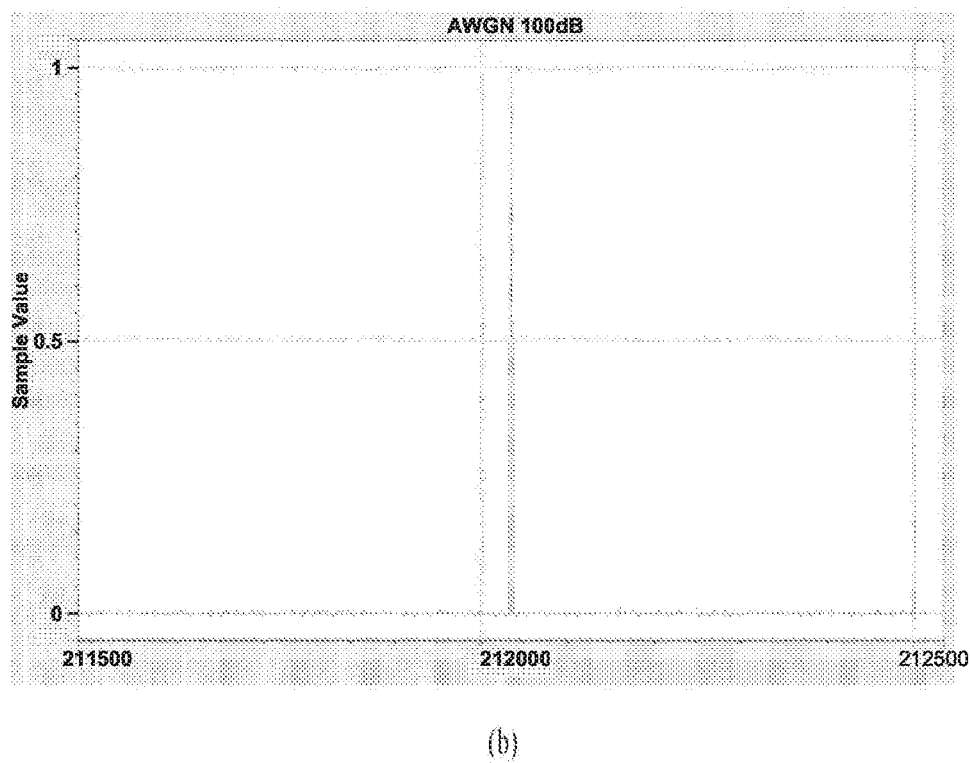
(b)

FIG. 24
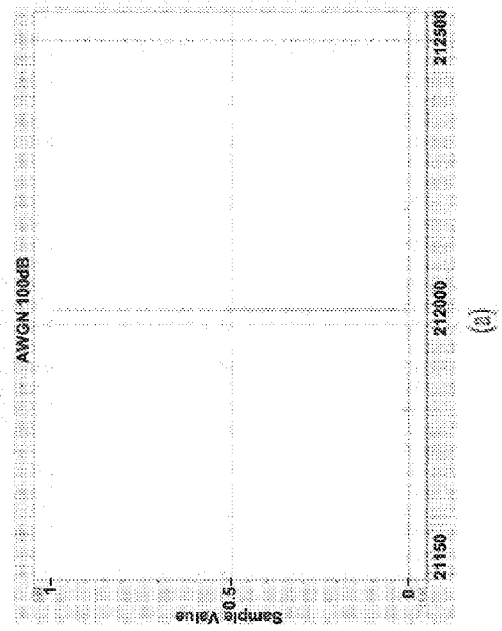
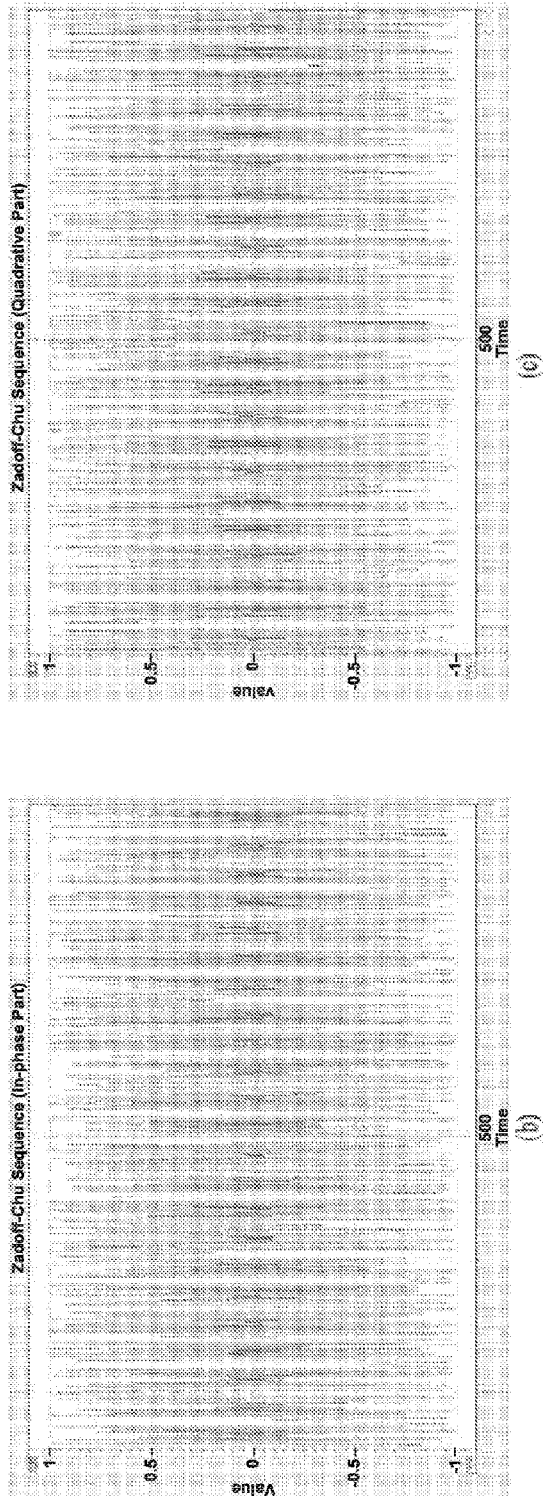

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

The present application is a continuation of U.S. application Ser. No. 14/157,314 filed Jan. 16, 2014, which Pursuant to 35 U.S.C. §119(e) claims the benefit of U.S. Provisional Application No. 61/753,871, filed on Jan. 17, 2013, 61/754,536, filed on Jan. 19, 2013 and 61/809,412, filed on Apr. 7, 2013, which is hereby incorporated by reference as if fully set forth herein.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a table showing requirements of the broadcast signal transmission/reception apparatus and method according to one embodiment of the present invention.

FIG. 22 shows graphs representing results obtained when the scrambling sequence according to an embodiment of the present invention is used.

FIG. 23 shows graphs representing results obtained when a scrambling sequence according to another embodiment of the present invention is used.

FIG. 24 shows graphs representing results obtained when a scrambling sequence according to another embodiment of the present invention is used.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV (Ultra High Definition TV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
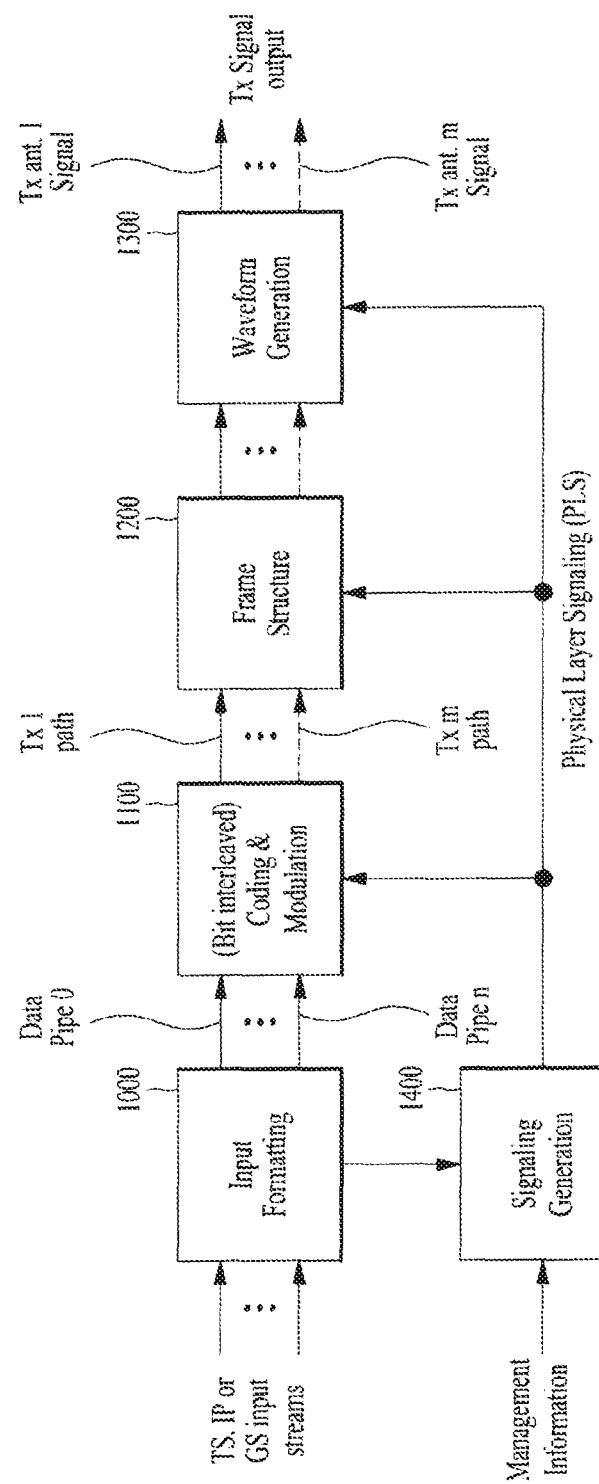
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
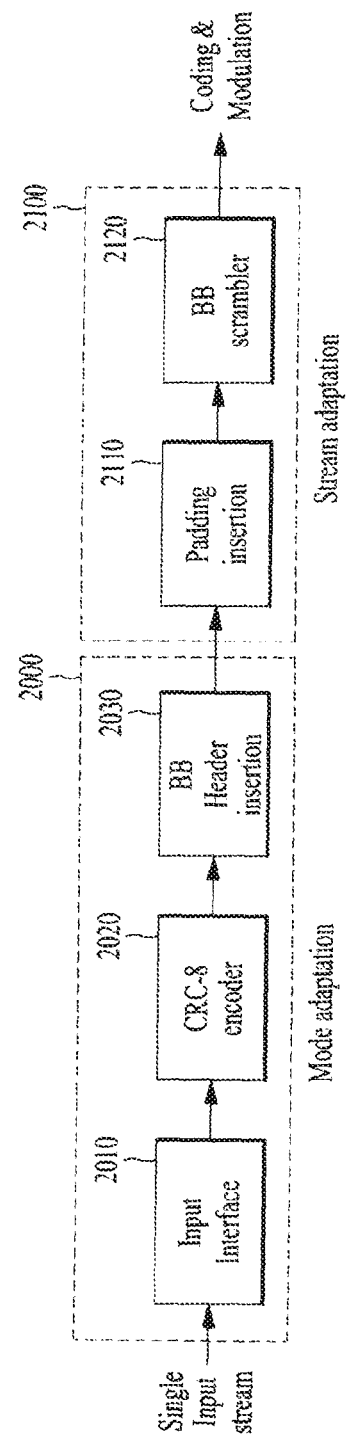
FIG. 2 illustrates an input formatting module according to an embodiment of the present invention.
Figure 3:
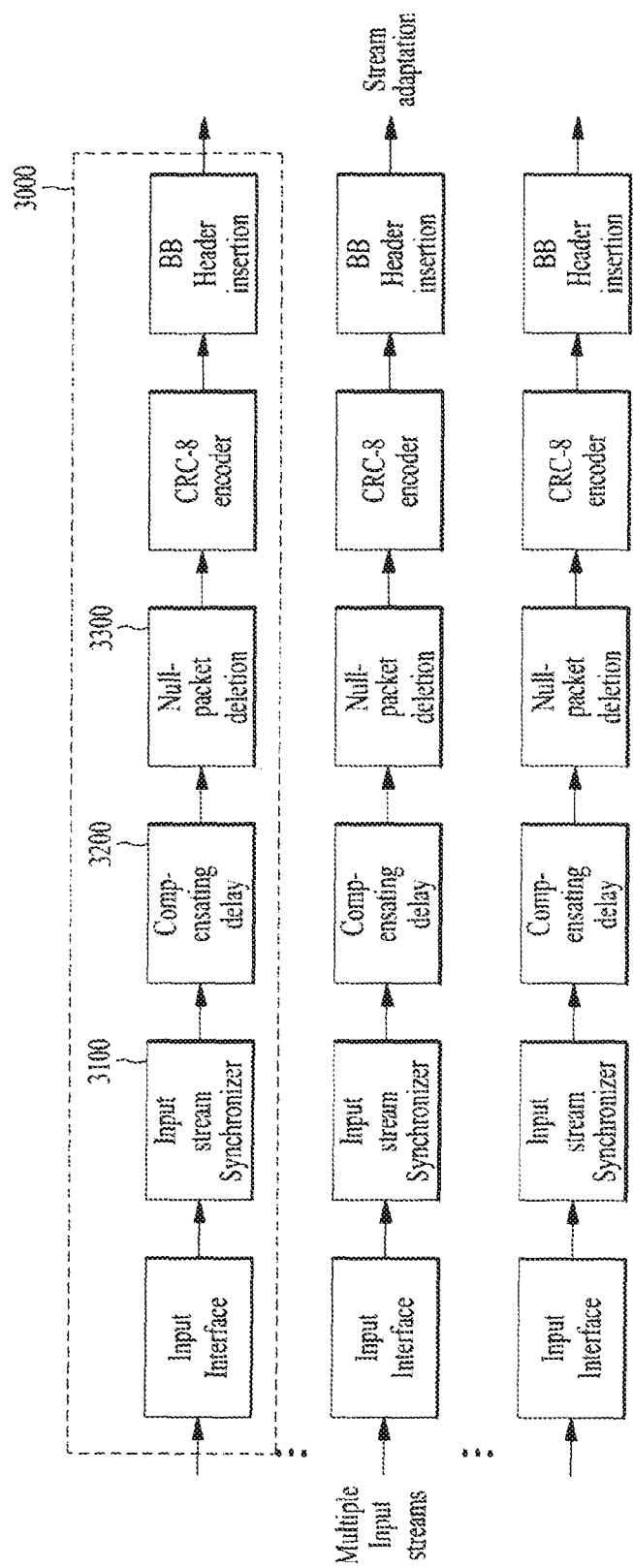
FIG. 3 illustrates an input formatting module according to another embodiment of the present invention.
Figure 4:
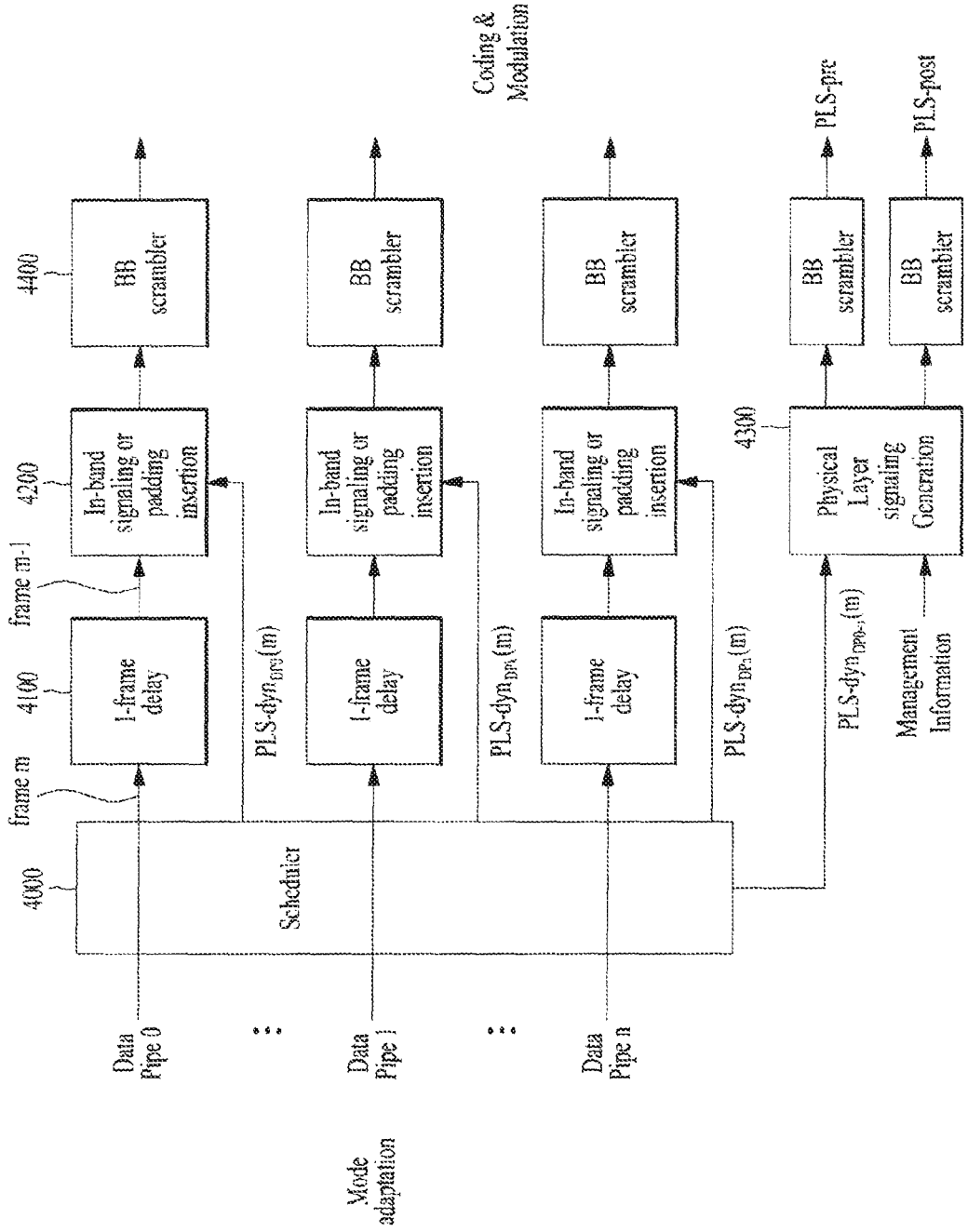
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
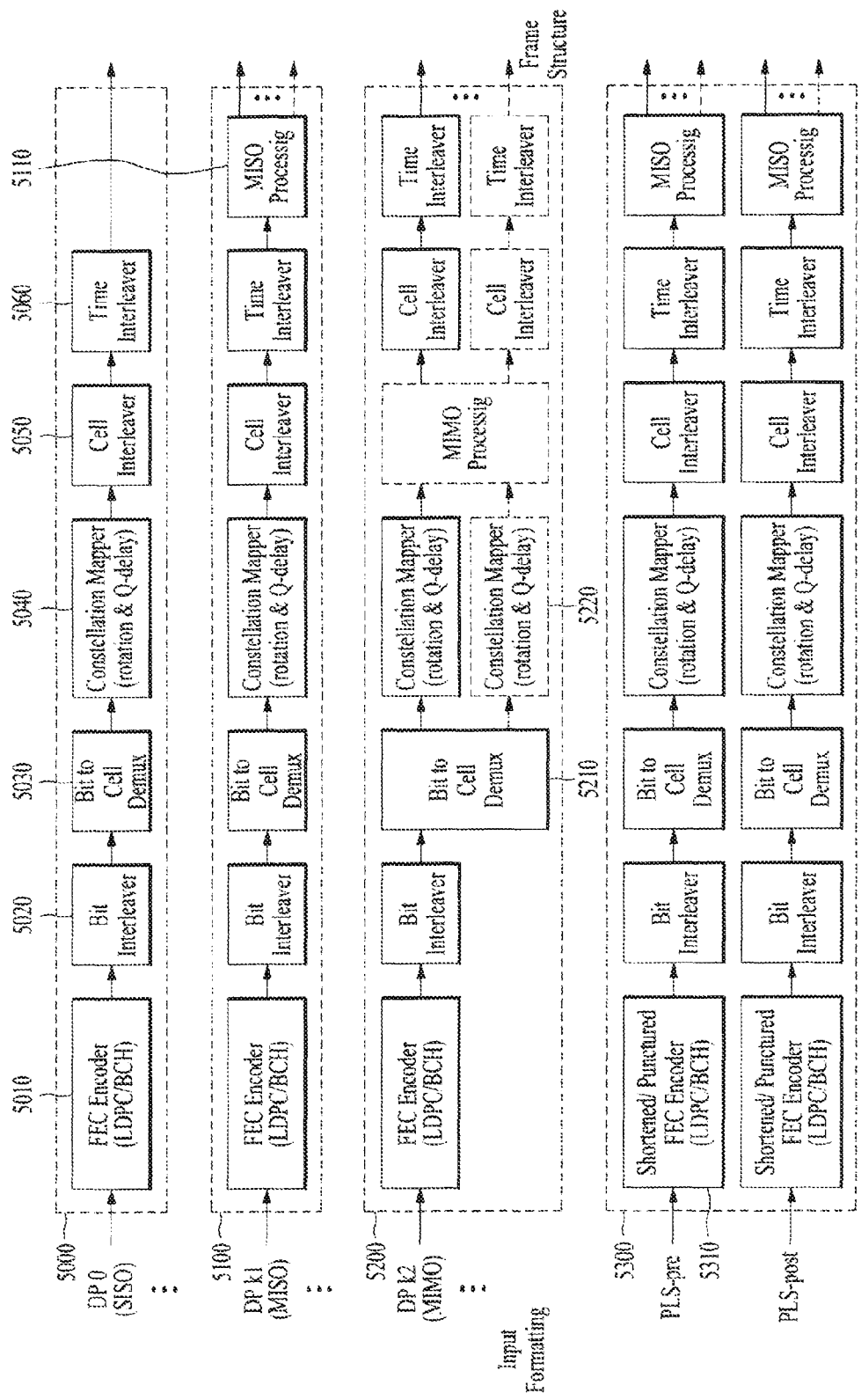
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
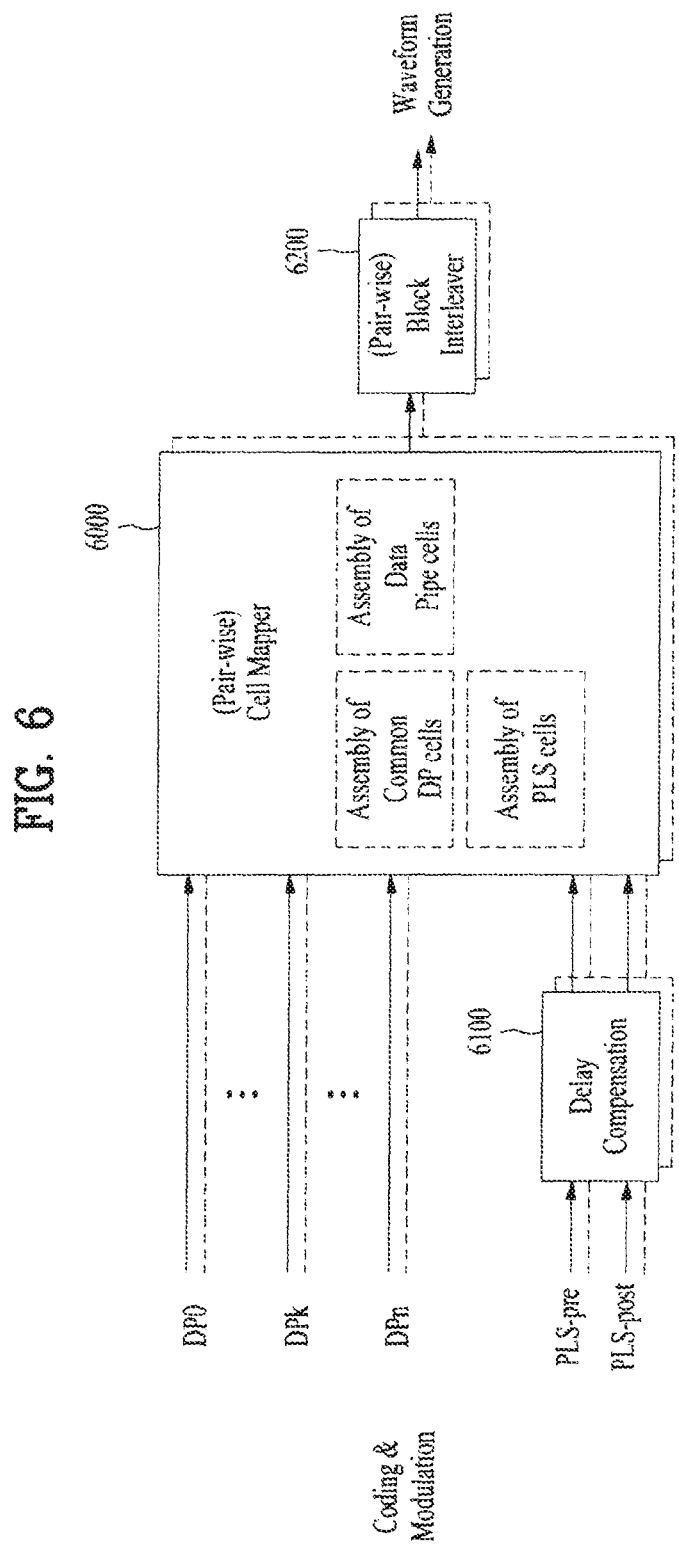
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
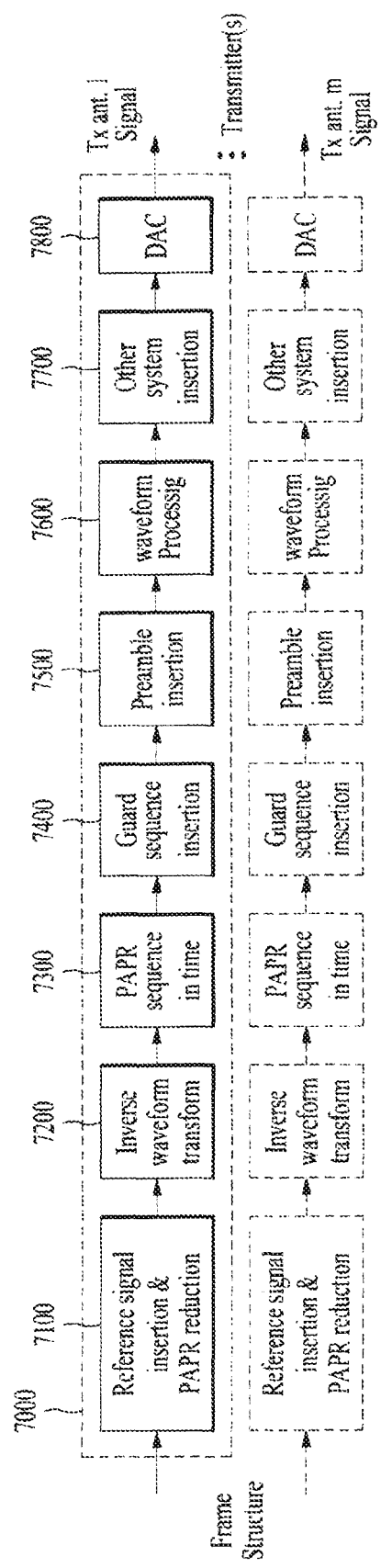
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
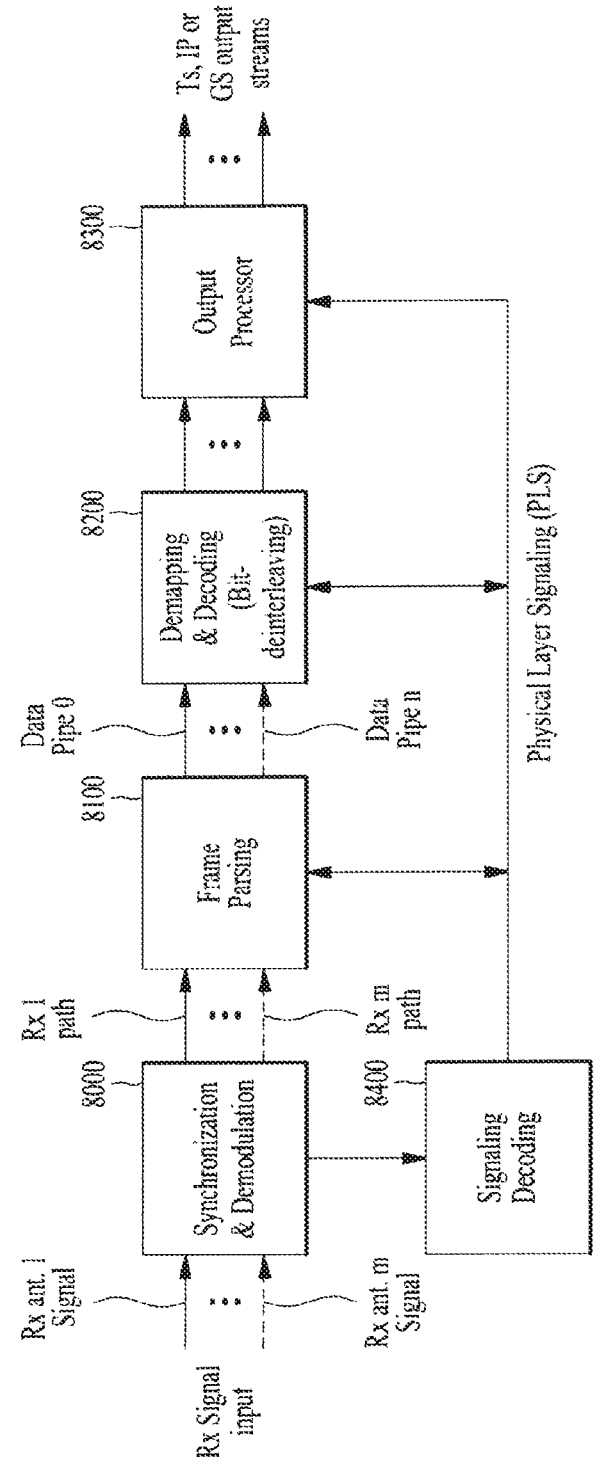
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
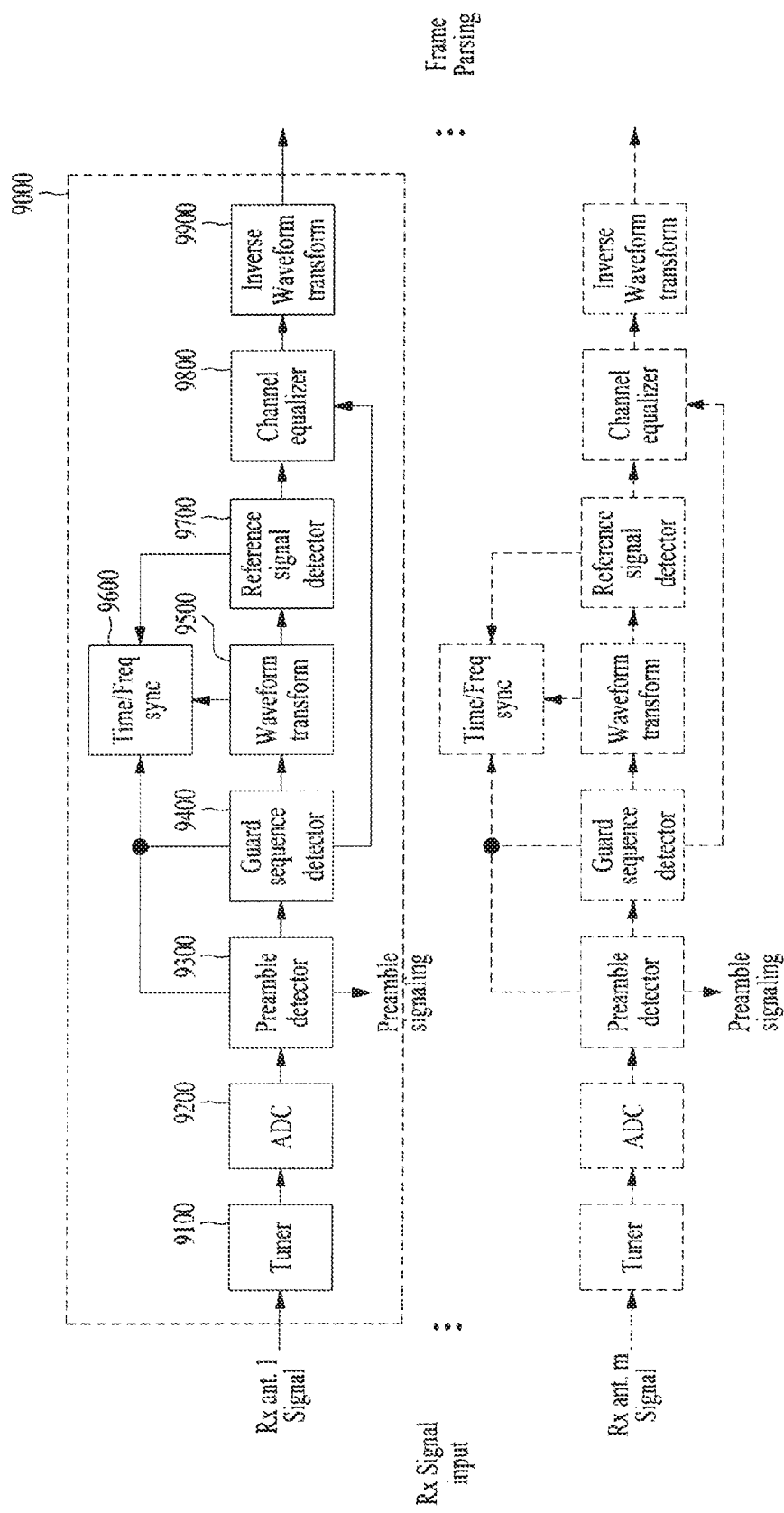
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
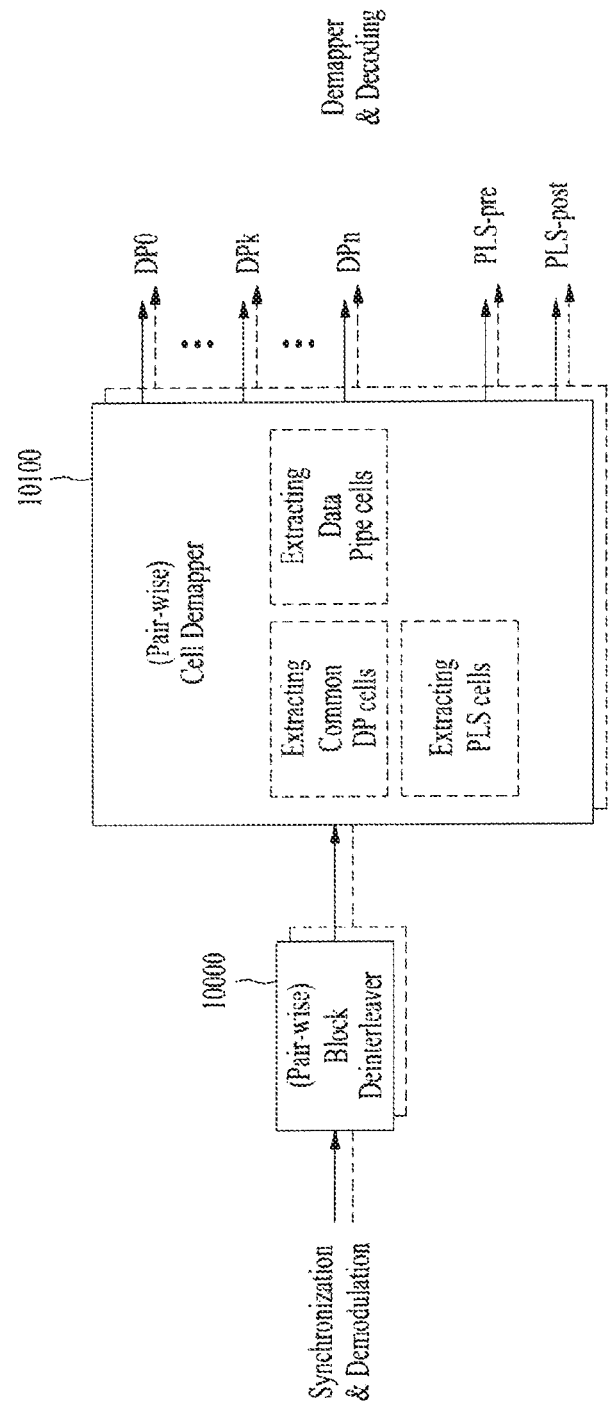
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block interleaver 10000 and at least one cell demapper 10100.

The block interleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block interleaver 10000 can process two consecutive pieces of data as a pair for each input path. Accordingly, the block interleaver 10000 can output two consecutive pieces of data even when deinterleaving has been performed. Furthermore, the block interleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
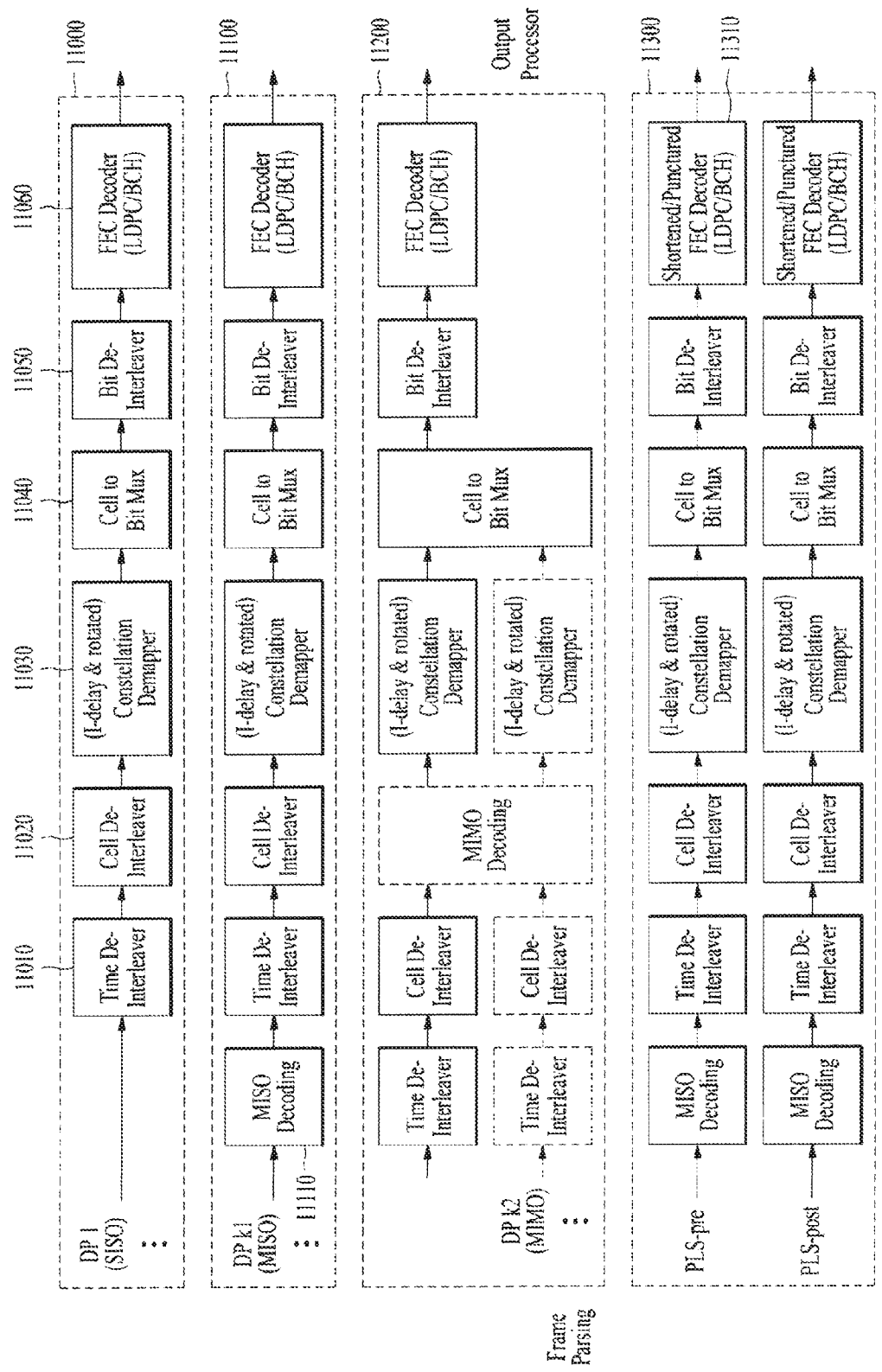
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
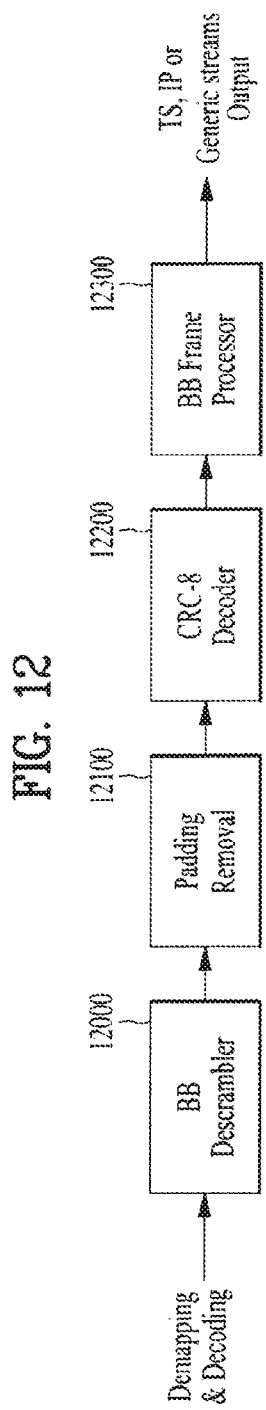
FIG. 12 illustrates an output processor according to an embodiment of the present invention.
Figure 13:
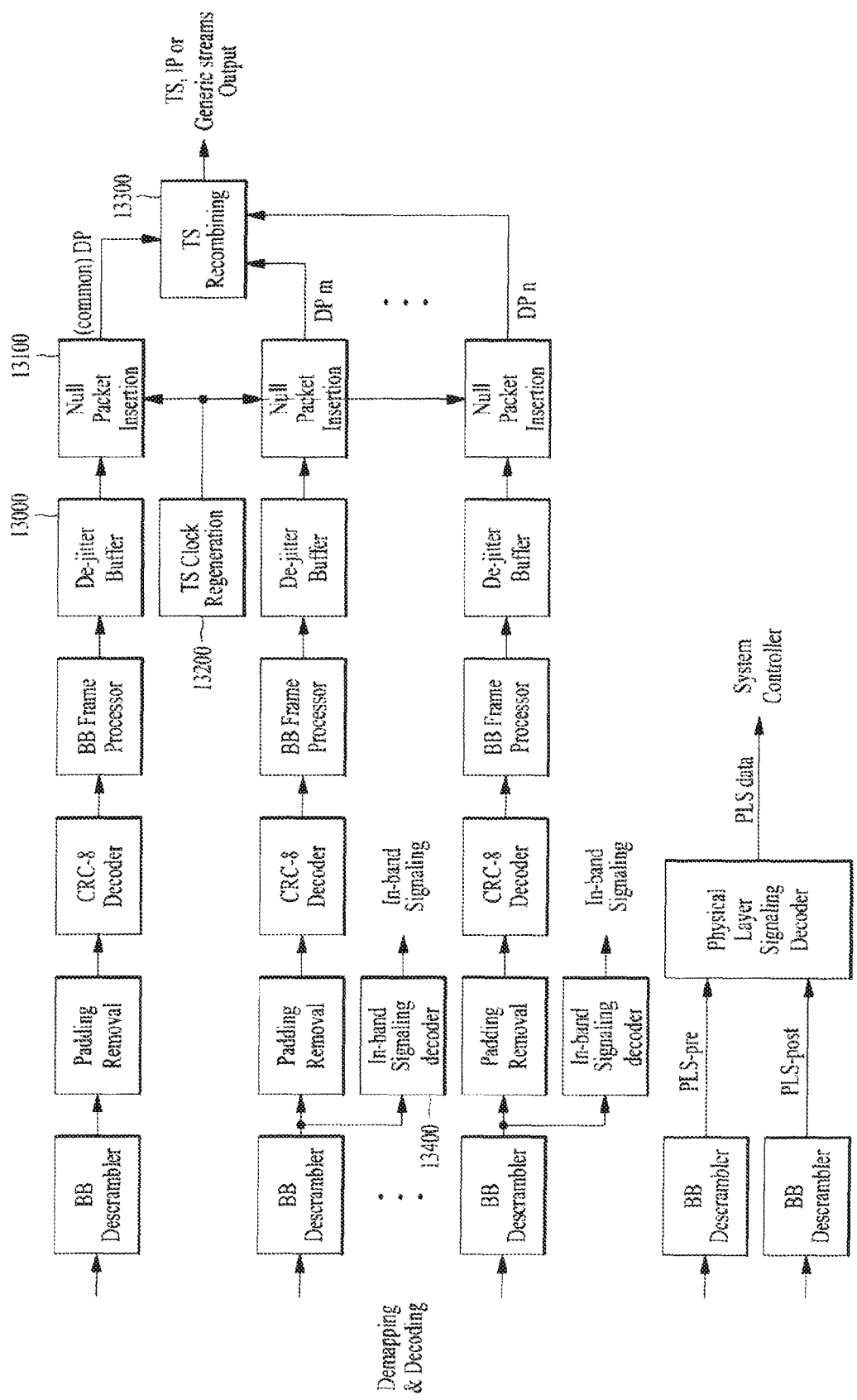
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
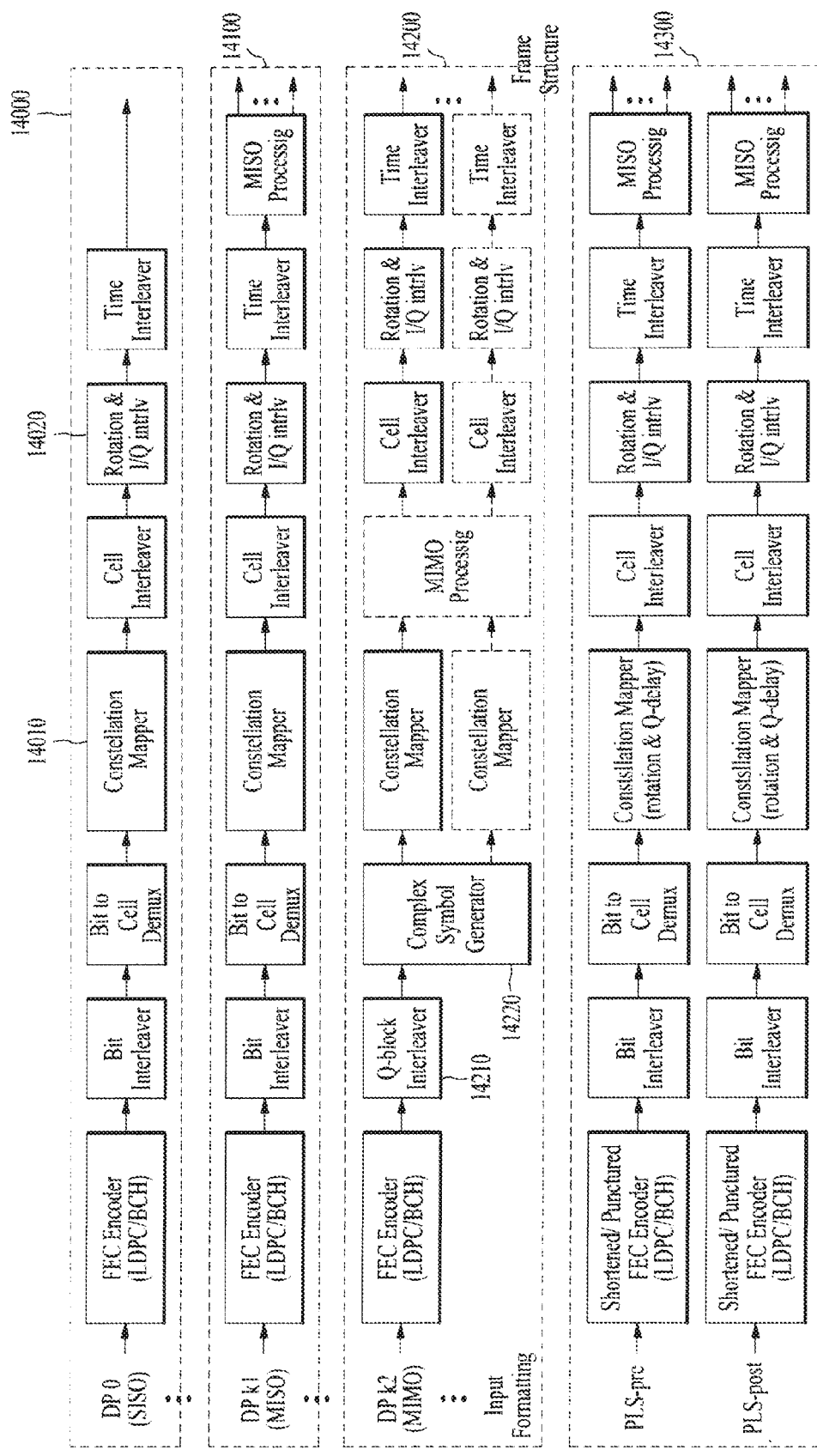
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & IIQ interleaver block 14020 is two or more which can be changed by the designer. In addition, the rotation & IIQ interleaver block 14020 may not interleave the in-phase component.

The rotation & I/Q interleaver block 14020 is commonly applicable to the first to fourth blocks 14000 to 14300, as described above. In this case, whether or not the rotation & IIQ interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
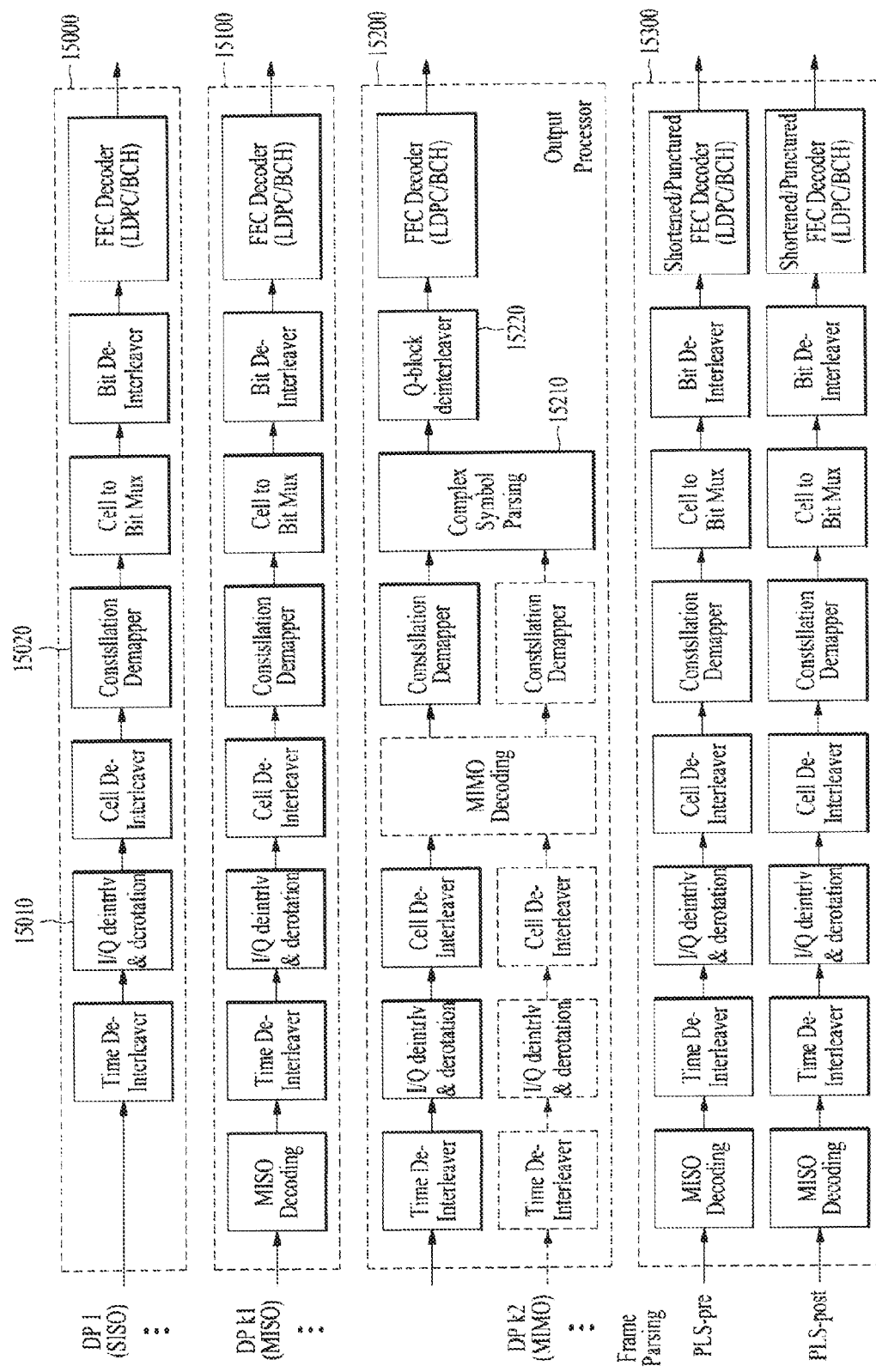
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

FIG. 16 is a table showing requirements of the broadcast signal transmission/reception apparatus and method according to one embodiment of the present invention.

The first row of the table shown in FIG. 16 represents requirements of the broadcast signal transmission/reception apparatus and method according to an embodiment of the present invention, the second row represents values of the requirements, the third row represents details of the requirements and the fourth row shows technical solutions to the requirements.

As shown in the seventh column 16000 illustrated in FIG. 16, the apparatus for transmitting broadcast signals according to an embodiment of the present invention is a flexible system capable of providing a fixed broadcast service like a terrestrial broadcast service, a portable broadcast service like a mobile broadcast service and a broadcast service having various qualities and purposes such as a UHD broadcast service. In addition, the apparatus for transmitting broadcast signals according to an embodiment of the present invention can multiplex data of various broadcast services on a frame-by-frame basis and transmit the multiplexed data and the apparatus for receiving broadcast signals according to an embodiment of the present invention can process received data in response to the operation of the apparatus for transmitting broadcast signals. Furthermore, the apparatus for transmitting broadcast signals according to an embodiment of the present invention can control QoS for each broadcast service in a physical layer stage, as described above.

As shown in the eighth column 16100 illustrated in FIG. 16, the apparatus for transmitting broadcast signals according to an embodiment of the present invention can provide a broadcast service using a portable antenna. Particularly, the apparatus for transmitting broadcast signals according to an embodiment of the present invention can provide a scalable video service composed of base layer data and enhancement layer data for ultra HDTV and mobile HDTV broadcast services.

In addition, as shown in the tenth column 16200 illustrated in FIG. 16, the apparatus for transmitting broadcast signals and the apparatus for receiving broadcast signals according to an embodiment of the present invention can provide an emergency alert system (EAS). Accordingly, the apparatus for transmitting broadcast signals according to an embodiment of the present invention can transmit an emergency alert system message information (or an emergency alert message information) through a specific data pipe in a signal frame in order to achieve fast access and higher robust of the emergency alert system message information (or the emergency alert message information).

Figure 17:
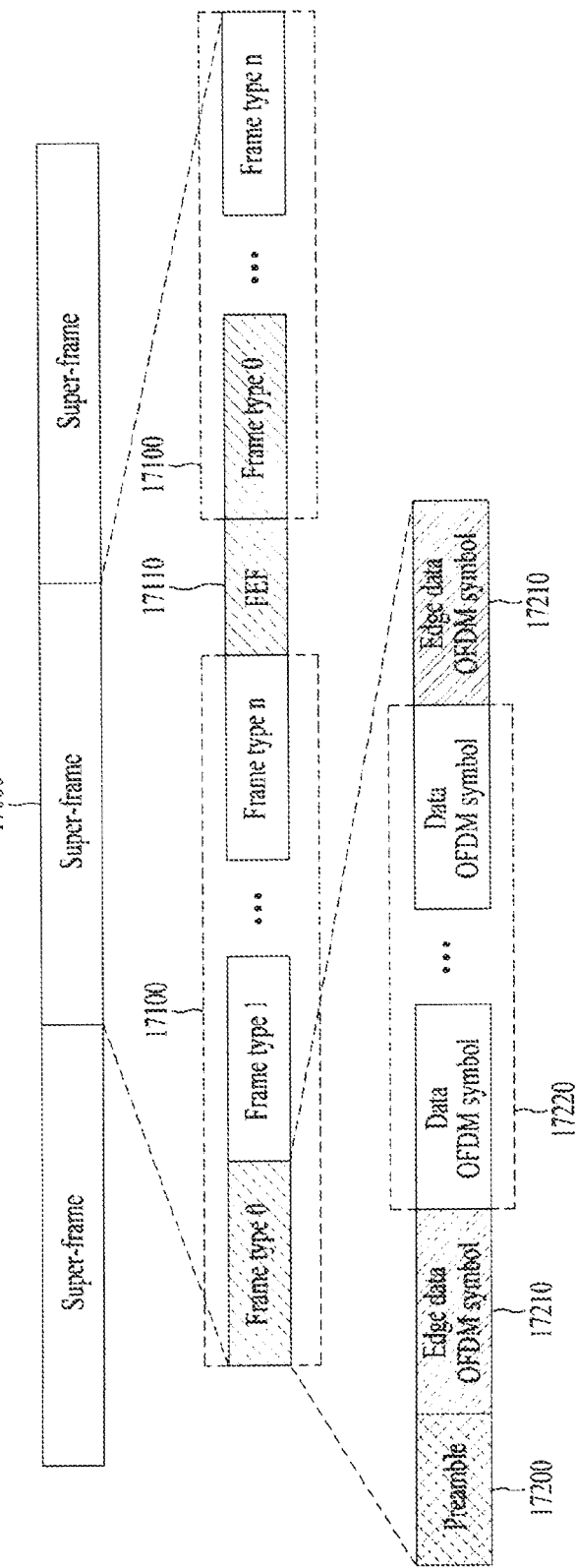
FIG. 17 illustrates a super-frame structure according to an embodiment of the present invention.

FIG. 17 illustrates a super-frame structure according to an embodiment of the present invention.

The apparatus for transmitting broadcast signals according to an embodiment of the present invention can sequentially transmit a plurality of super-frames carrying data corresponding to a plurality of broadcast services.

As shown in FIG. 17, frames 17100 of different types and a future extension frame (FEF) 17110 can be multiplexed in the time domain and transmitted in a super-frame 17000. The apparatus for transmitting broadcast signals according to an embodiment of the present invention can multiplex signals of different broadcast services on a frame-by-frame basis and transmit the multiplexed signals in the same RF channel, as described above. The different broadcast services may require different reception conditions or different coverages according to characteristics and purposes thereof. Accordingly, signal frames can be classified into types for transmitting data of different broadcast services and data included in the signal frames can be processed by different transmission parameters. In addition, the signal frames can have different FFT sizes and guard intervals according to broadcast services transmitted through the signal frames. The FEF 17110 shown in FIG. 17 is a frame available for future new broadcast service systems.

The signal frames 17100 of different types according to an embodiment of the present invention can be allocated to a super-frame according to design. Specifically, the signal frames 17100 of different types can be repeatedly allocated to the super-frame in a multiplexed pattern. Otherwise, a plurality of signal frames of the same type can be sequentially allocated to a super-frame and then signal frames of a different type can be sequentially allocated to the super-frame. The signal frame allocation scheme can be changed by the designer.

Each signal frame can include a preamble 17200, an edge data OFDM symbol 17210 and a plurality of data OFDM symbols 17220, as shown in FIG. 17.

The preamble 17200 can carry signaling information related to the corresponding signal frame, for example, a transmission parameter. That is, the preamble carries basic PLS data and is located in the beginning of a signal frame. In addition, the preamble 17200 can carry the PLS data described with reference to FIG. 1. That is, the preamble can carry only basic PLS data or both basic PLS data and the PLS data described with reference to FIG. 1. The information carried through the preamble can be changed by the designer. The signaling information carried through the preamble can be referred to as preamble signaling information.

The edge data OFDM symbol 17210 is an OFDM symbol located at the beginning or end of the corresponding frame and can be used to transmit pilots in all pilot carriers of data symbols. The edge data OFDM symbol may be in the form of a known data sequence or a pilot. The position of the edge data OFDM symbol 17210 can be changed by the designer.

The plurality of data OFDM symbols 17220 can carry data of broadcast services.

Since the preamble 17200 illustrated in FIG. 17 includes information indicating the start of each signal frame, the apparatus for receiving broadcast signals according to an embodiment of the present invention can detect the preamble 17200 to perform synchronization of the corresponding signal frame. Furthermore, the preamble 17200 can include information for frequency synchronization and basic transmission parameters for decoding the corresponding signal frame.

Accordingly, even if the apparatus for receiving broadcast signals according to an embodiment of the present invention receives signal frames of different types multiplexed in a super-frame, the apparatus for receiving broadcast signals can discriminate signal frames by decoding preambles of the signal frames and acquire a desired broadcast service.

That is, the apparatus for receiving broadcast signals according to an embodiment of the present invention can detect the preamble 17200 in the time domain to check whether or not the corresponding signal is present in the broadcast signal transmission and reception system according to an embodiment of the present invention. Then, the apparatus for receiving broadcast signals according to an embodiment of the present invention can acquire information for signal frame synchronization from the preamble 17200 and compensate for a frequency offset. Furthermore, the apparatus for receiving broadcast signals according to an embodiment of the present invention can decode signaling information carried by the preamble 17200 to acquire basic transmission parameters for decoding the corresponding signal frame. Then, the apparatus for receiving broadcast signals according to an embodiment of the present invention can obtain desired broadcast service data by decoding signaling information for acquiring broadcast service data transmitted through the corresponding signal frame.

Figure 18:
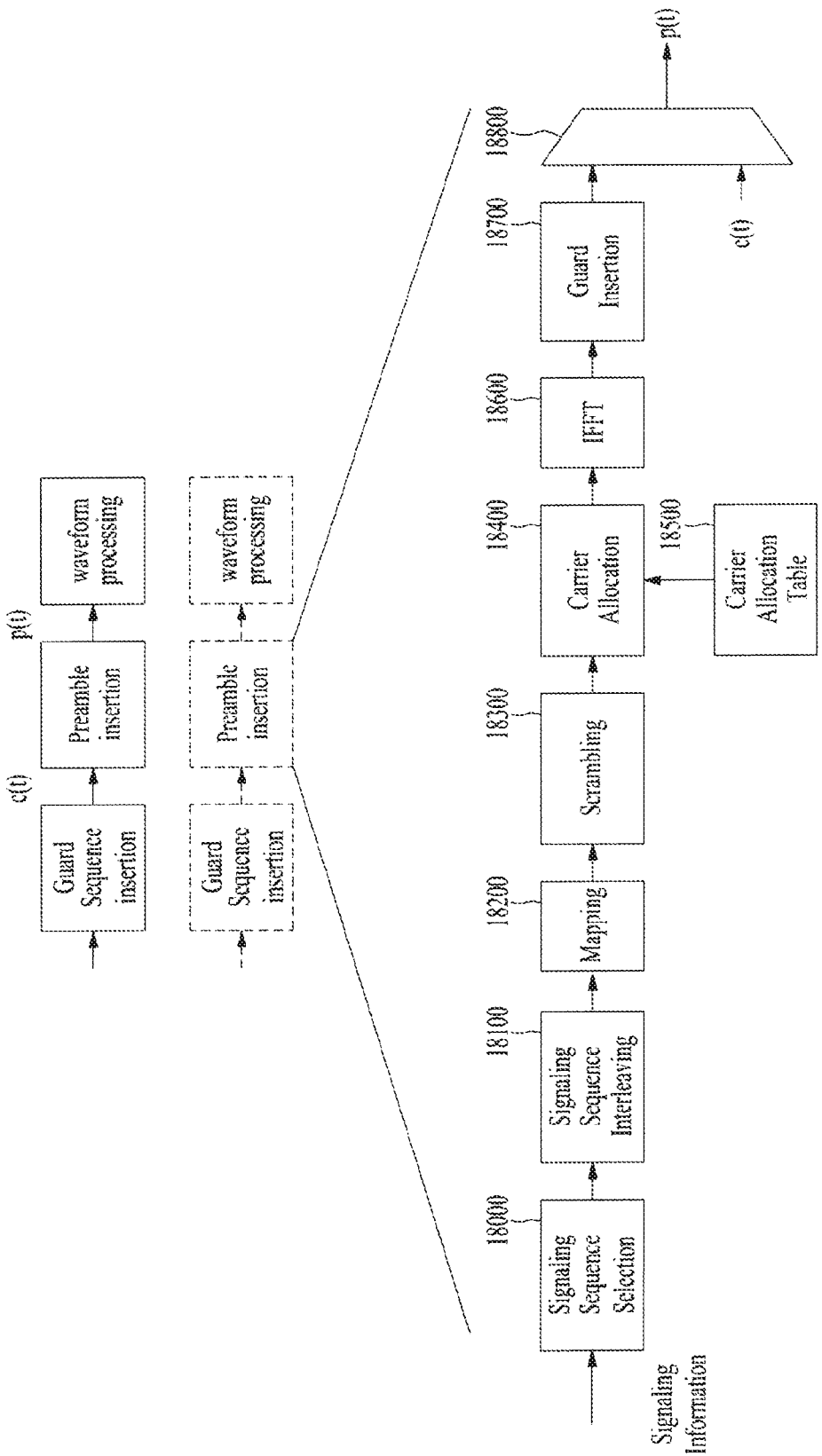
FIG. 18 illustrates a preamble insertion block according to an embodiment of the present invention.

FIG. 18 illustrates a preamble insertion block according to an embodiment of the present invention.

The preamble insertion block illustrated in FIG. 18 corresponds to an embodiment of the preamble insertion block 7500 described with reference to FIG. 7 and can generate the preamble described in FIG. 17.

As shown in FIG. 18, the preamble insertion block according to an embodiment of the present invention can include a signaling sequence selection block 18000, a signaling sequence interleaving block 18100, a mapping block 18200, a scrambling block 18300, a carrier allocation block 18400, a carrier allocation table block 18500, an IFFT block 18600, a guard insertion block 18700 and a multiplexing block 18800. Each block may be modified or may not be included in the preamble insertion block by the designer. A description will be given of each block of the preamble insertion block.

The signaling sequence selection block 18000 can receive the signaling information to be transmitted through the preamble and select a signaling sequence suitable for the signaling information.

The signaling sequence interleaving block 18100 can interleave signaling sequences for transmitting the input signaling information according to the signaling sequence selected by the signaling sequence selection block 18000. Details will be described later.

The mapping block 18200 can map the interleaved signaling information using a modulation scheme.

The scrambling block 18300 can multiply mapped data by a scrambling sequence.

The carrier allocation block 18400 can allocate the data output from the scrambling block 18300 to predetermined carrier positions using active carrier position information output from the carrier allocation table block 18500.

The IFFT block 18600 can transform the data allocated to carriers, output from the carrier allocation block 18400, into an OFDM signal in the time domain.

The guard insertion block 18700 can insert a guard interval into the OFDM signal.

The multiplexing block 18800 can multiplex the signal output from the guard insertion block 18700 and a signal c(t) output from the guard sequence insertion block 7400 illustrated in FIG. 7 and output an output signal p(t). The output signal p(t) can be input to the waveform processing block 7600 illustrated in FIG. 7.

Figure 19:
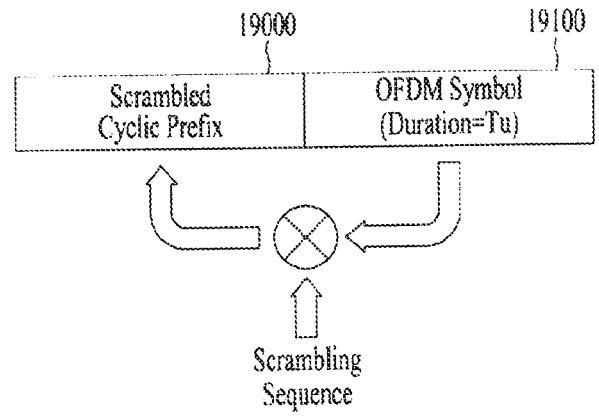
FIG. 19 illustrates a preamble structure according to an embodiment of the present invention.

FIG. 19 illustrates a preamble structure according to an embodiment of the present invention.

The preamble shown in FIG. 19 can be generated by the preamble insertion block illustrated in FIG. 18.

The preamble according to an embodiment of the present invention has a structure of a preamble signal in the time domain and can include a scrambled cyclic prefix part 19000 and an OFDM symbol 19100. In addition, the preamble according to an embodiment of the present invention may include an OFDM symbol and a scrambled cyclic postfix part. In this case, the scrambled cyclic postfix part may follow the OFDM symbol, differently from the scrambled prefix, and may be generated through the same process as the process for generating the scrambled cyclic prefix, which will be described later. The position and generation process of the scrambled cyclic postfix part may be changed according to design.

The scrambled cyclic prefix part 19000 shown in FIG. 19 can be generated by scrambling part of the OFDM symbol or the whole OFDM symbol and can be used as a guard interval.

Accordingly, the apparatus for receiving broadcast signals according to an embodiment of the present invention can detect a preamble through guard interval correlation using a guard interval in the form of a cyclic prefix even when a frequency offset is present in a received broadcast signal since frequency synchronization cannot be performed.

In addition, the guard interval in the scrambled cyclic prefix form according to an embodiment of the present invention can be generated by multiplying (or combining) the OFDM symbol by a scrambling sequence (or sequence). Or the guard interval in the scrambled cyclic prefix form according to an embodiment of the present invention can be generated by scrambling the OFDM symbol with a scrambling sequence (or sequence), The scrambling sequence according to an embodiment of the present invention can be a signal of any type which can be changed by the designer.

The method of generating the guard interval in the scrambled cyclic prefix form according to an embodiment of the present invention has the following advantages.

Firstly, a preamble can be easily detected by discriminating the guard interval from a normal OFDM symbol. As described above, the guard interval in the scrambled cyclic prefix form is generated by being scrambled by the scrambling sequence, distinguished from the normal OFDM symbol. In this case, if the apparatus for receiving broadcast signals according to an embodiment of the present invention performs guard interval correlation, the preamble can be easily detected since only a correlation peak according to the preamble is generated without a correlation peak according to the normal OFDM symbol.

Secondly, when the guard interval in the scrambled cyclic prefix form according to an embodiment of the present invention is used, a dangerous delay problem can be solved. For example, if the apparatus for receiving broadcast signals performs guard interval correlation when multi-path interference delayed by the duration Tu of the OFDM symbol is present, preamble detection performance may be deteriorated since a correlation value according to multiple paths is present at all times. However, when the apparatus for receiving broadcast signals according to an embodiment of the present invention performs guard interval correlation, the apparatus for receiving broadcast signals can detect the preamble without being affected by the correlation value according to multiple paths since only a peak according to the scrambled cyclic prefix is generated, as described above.

Finally, the influence of continuous wave (CW) interference can be prevented. If a received signal includes CW interference, the signal detection performance and synchronization performance of the apparatus for receiving broadcast signals can be deteriorated since a DC component caused by CW is present at all times when the apparatus for receiving broadcast signals performs guard interval correlation. However, when the guard interval in the scrambled cyclic prefix form according to an embodiment of the present invention is used, the influence of CW can be prevented since the DC component caused by CW is averaged out by the scrambling sequence.

Figure 20:
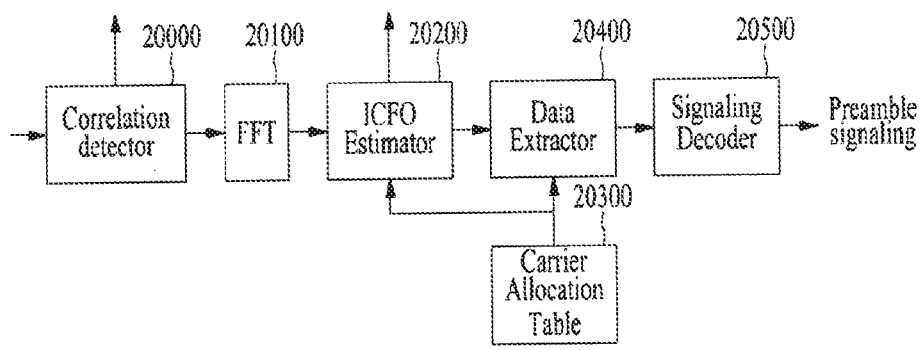
FIG. 20 illustrates a preamble detector according to an embodiment of the present invention.

FIG. 20 illustrates a preamble detector according to an embodiment of the present invention.

The preamble detector shown in FIG. 20 corresponds to an embodiment of the preamble detector 9300 included in the synchronization & demodulation module illustrated in FIG. 9 and can detect the preamble illustrated in FIG. 17.

As shown in FIG. 20, the preamble detector according to an embodiment of the present invention can include a correlation detector 20000, an FFT block 20100, an ICFO (integer carrier frequency offset) estimator 20200, a carrier allocation table block 20300, a data extractor 20300 and a signaling decoder 20500. Each block may be modified or may not be included in the preamble detector according to design. A description will be given of operation of each block of the preamble detector.

The correlation detector 20000 can detect the above-described preamble and estimate frame synchronization, OFDM symbol synchronization, timing information and FCFO (fractional frequency offset). Details will be described later.

The FFT block 20100 can transform the OFDM symbol part included in the preamble into a frequency domain signal using the timing information output from the correlation detector 20000.

The ICFO estimator 20200 can receive position information on active carriers, output from the carrier allocation table block 20300, and estimate ICFO information.

The data extractor 20300 can receive the ICFO information output from the ICFO estimator 20200 to extract signaling information allocated to the active carriers and the signaling decoder 20500 can decode the extracted signaling information.

Accordingly, the apparatus for receiving broadcast signals according to an embodiment of the present invention can obtain the signaling information carried by the preamble through the above-described procedure.

Figure 21:
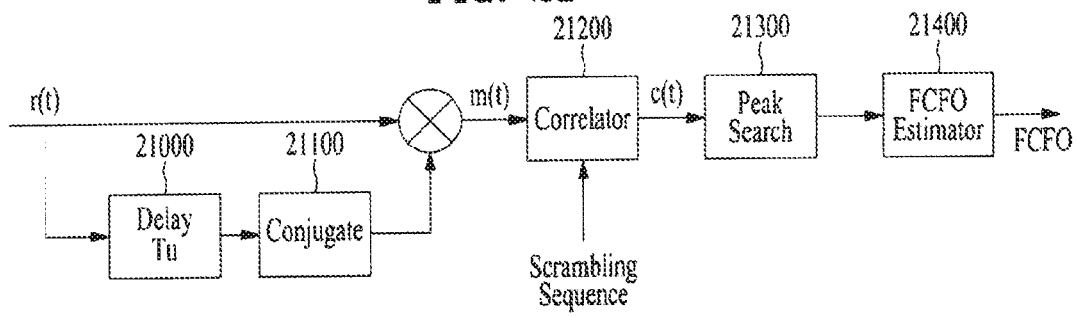
FIG. 21 illustrates a correlation detector according to an embodiment of the present invention.

FIG. 21 illustrates a correlation detector according to an embodiment of the present invention.

The correlation detector shown in FIG. 21 corresponds to an embodiment of the correlation detector illustrated in FIG. 20.

The correlation detector according to an embodiment of the present invention can include a delay block 21000, a conjugate block 21100, a multiplier, a correlator block 21200, a peak search block 21300 and an FCFO estimator block 21400. A description will be given of operation of each block of the correlation detector.

The delay block 21000 of the correlation detector can delay an input signal r(t) by the duration Tu of the OFDM symbol in the preamble.

The conjugate block 21100 can perform conjugation on the delayed signal r(t).

The multiplier can multiply the signal r(t) by the conjugated signal r(t) to generate a signal m(t).

The correlator block 21200 can correlate the signal m(t) input thereto and the scrambling sequence to generate a descrambled signal c(t).

The peak search block 21300 can detect a peak of the signal c(t) output from the correlator block 21200. In this case, since the scrambled cyclic prefix included in the preamble is descrambled by the scrambling sequence, a peak of the scrambled cyclic prefix can be generated. However, OFDM symbols or components caused by multiple paths other than the scrambled cyclic prefix are scrambled by the scrambling sequence, and thus a peak of the OFDM symbols or components caused by multiple paths is not generated. Accordingly, the peak search block 21300 can easily detect the peak of the signal c(t).

The FCFO estimator block 21400 can acquire frame synchronization and OFDM symbol synchronization of the signal input thereto and estimate FCFO information from a correlation value corresponding to the peak.

As described above, the scrambling sequence according to an embodiment of the present invention can be a signal of any type and can be changed by the designer.

FIGS. 22, 23 and 24 are graphs showing results obtained when a chirp-like sequence, a balanced m-sequence and a Zadoff-Chu sequence are used as the scrambling sequence.

Each figure will now be described.

FIG. 22 shows graphs representing results obtained when the scrambling sequence according to an embodiment of the present invention is used.

The graph of FIG. 22 shows results obtained when the scrambling sequence according to an embodiment of the present invention is a chirp-like sequence. The chirp-like sequence can be calculated according to Expression 1.

$$\begin{array}{ll} e^{j2\pi k/80} & \text{for } k = 0 \sim 79, \\ e^{j2\pi k/144} & \text{for } k = 80 \sim 223, \\ e^{j2\pi k/272} & \text{for } k = 224 \sim 495, \\ e^{j2\pi k/528} & \text{for } k = 496 \sim 1023 \end{array} \qquad \text{[Expression 1]}$$

As represented by Expression 1, the chirp-like sequence can be generated by connecting sinusoids of 4 different frequencies corresponding to one period.

As shown in FIG. 22, (a) is a graph showing waveforms of the chirp-like sequence according to an embodiment of the present invention.

The first waveform 22000 shown in (a) represents a real number part of the chirp-like sequence and the second waveform 22100 represents an imaginary number part of the chirp-like sequence. The duration of the chirp-like sequence corresponds to 1024 samples and the averages of a real number part sequence and an imaginary number part sequence are 0.

As shown in FIG. 22, (b) is a graph showing the waveform of the signal c(t) output from the correlator block illustrated in FIGS. 20 and 21 when the chirp-like sequence is used.

Since the chirp-like sequence is composed of signals having different periods, dangerous delay is not generated. Furthermore, the correlation property of the chirp-like sequence is similar to guard interval correlation and thus distinctly discriminated from the preamble of conventional broadcast signal transmission/reception systems. Accordingly, the apparatus for receiving broadcast signals according to an embodiment of the present invention can easily detect the preamble. In addition, the chirp-like sequence can provide correct symbol timing information and is robust to noise on a multi-path channel, compared to a sequence having a delta-like correlation property, such as an m-sequence. Furthermore, when scrambling is performed using the chirp-like sequence, it is possible to generate a signal having a bandwidth slightly increased compared to the original signal.

FIG. 23 shows graphs representing results obtained when a scrambling sequence according to another embodiment of the present invention is used.

The graphs of FIG. 23 are obtained when the balanced m-sequence is used as a scrambling sequence. The balanced m-sequence according to an embodiment of the present invention can be calculated by Expression 2.

$$g(x)=x^{10}+x^{8}+x^{4}+x^{3}+1 \qquad \text{[Expression 2]}$$

The balanced m-sequence can be generated by adding a sample having a value of '+1' to an m-sequence having a length corresponding to 1023 samples according to an embodiment of the present invention. The length of balanced m-sequence is 1024 samples and the average thereof is '0' according to one embodiment. The length and average of the balanced m-sequence can be changed by the designer.

As shown in FIG. 23, (a) is a graph showing the waveform of the balanced m-sequence according to an embodiment of the present invention and (b) is a graph showing the waveform of the signal c(t) output from the correlator block illustrated in FIGS. 20 and 21 when the balanced m-sequence is used.

When the balanced m-sequence according to an embodiment of the present invention is used, the apparatus for receiving broadcast signals according to an embodiment of the present invention can easily perform symbol synchronization on a received signal since preamble correlation property corresponds to a delta function.

FIG. 24 shows graphs representing results obtained when a scrambling sequence according to another embodiment of the present invention is used.

The graphs of FIG. 24 show results obtained when the Zadoff-Chu sequence is used as a scrambling sequence. The Zadoff-Chu sequence according to an embodiment of the present invention can be calculated by Expression 3.

$$e^{-j\pi u k(k+1)/1023} \quad \text{for } k = 0 \sim 1022, u = 23 \qquad \text{[Expression 3]}$$

The Zadoff-Chu sequence may have a length corresponding to 1023 samples and u value of 23 according to one embodiment. The length and u value of the Zadoff-Chu sequence can be changed by the designer.

As shown in FIG. 24, (a) is a graph showing the waveform of the signal c(t) output from the correlator block illustrated in FIGS. 20 and 21 when the Zadoff-Chu sequence according to an embodiment of the present invention is used.

As shown in FIG. 24, (b) is a graph showing the in-phase waveform of the Zadoff-Chu sequence according to an embodiment of the present invention and (c) is a graph showing the quadrature phase waveform of the Zadoff-Chu sequence according to an embodiment of the present invention.

When the Zadoff-Chu sequence according to an embodiment of the present invention is used, the apparatus for receiving broadcast signals according to an embodiment of the present invention can easily perform symbol synchronization on a received signal since preamble correlation property corresponds to a delta function. In addition, the envelope of the received signal is uniform in both the frequency domain and time domain.

As described above with reference to FIG. 18, the signaling sequence interleaving block 18100 included in the preamble insertion block according to an embodiment of the present invention can interleave the signaling sequences for transmitting the input signaling information according to the signaling sequence selected by the signaling sequence selection block 18000.

A description will be given of a method through which the signaling sequence interleaving block 18100 according to an embodiment of the present invention interleaves the signaling information in the frequency domain of the preamble.

Figure 25:
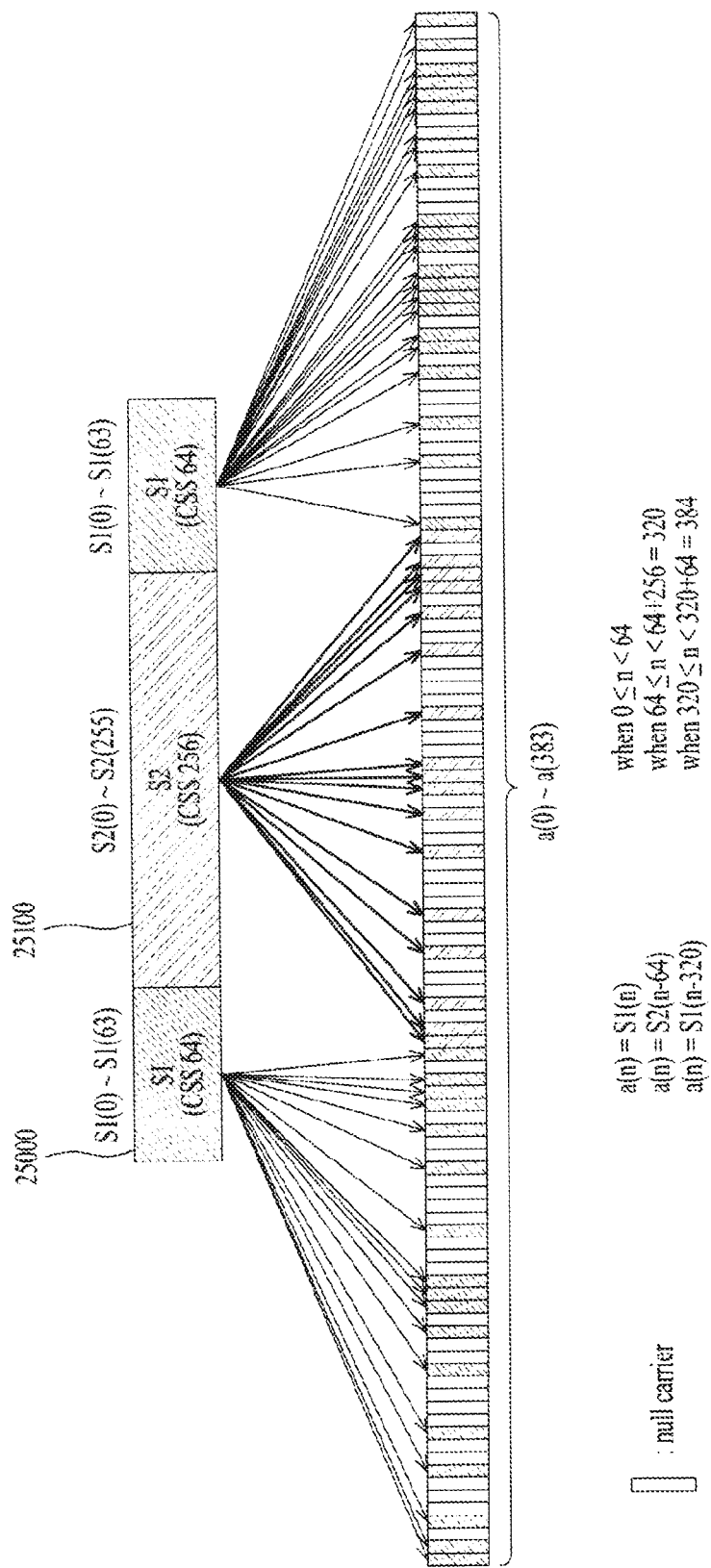
FIG. 25 illustrates a signaling information interleaving procedure according to an embodiment of the present invention.

FIG. 25 illustrates a signaling information interleaving procedure according to an embodiment of the present invention.

The preamble according to an embodiment of the present invention, described above with reference to FIG. 17, can have a size of 1K symbol and only 384 active carriers from among carriers constituting the 1K symbol can be used. The size of the preamble or the number of active carriers used can be changed by the designer. The signalling data carried in the preamble is composed of 2 signalling fields, namely S1 and S2.

As shown in FIG. 25, the signaling information carried by the preamble according to an embodiment of the present invention can be transmitted through bit sequences of S1 and bit sequences of S2.

The bit sequences of S1 and the bit sequences of S2 according to an embodiment of the present invention represent signaling sequences that can be allocated to active carriers to respectively carry signaling information (or signaling fields) included in the preamble.

Specifically, S1 can carry 3-bit signaling information and can be configured in a structure in which a 64-bit sequence is repeated twice. In addition, S1 can be located before and after S2. S2 is a single 256-bit sequence and can carry 4-bit signaling information. The bit sequences of S1 and S2 are represented as sequential numbers starting from 0 according to an embodiment of the present invention. Accordingly, the first bit sequence of Si can be represented as S1(0) and the first bit sequence of S2 can be represented as S2(0), as shown in FIG. 25. This can be changed by the designer.

S1 can carry information for identifying the signal frames included in the super-frame described in FIG. 17, for example, a signal frame processed according to SISO, a signal frame processed according to MISO or information indicating FE. S2 can carry information about the FFT size of the current signal frame, information indicating whether or not frames multiplexed in a super-frame are of the same type or the like. Information that can be carried by S1 and S2 can be changed according to design.

As shown in FIG. 25, the signaling sequence interleaving block 18100 according to an embodiment of the present invention can sequentially allocate S1 and S2 to active carriers corresponding to predetermined positions in the frequency domain.

In one embodiment of the present invention, 384 carriers are present and are represented as sequential numbers starting from 0. Accordingly, the first carrier according to an embodiment of the present invention can be represented as a(0), as shown in FIG. 25. In FIG. 25, uncolored active carriers are null carriers to which S1 or S2 is not allocated from among the 384 carriers.

As illustrated in FIG. 25, bit sequences of S1 can be allocated to active carriers other than null carriers from among active carriers a(0) to a(63), bit sequences of S2 can be allocated to active carriers other than null carriers from among active carriers a(64) to a(319) and bit sequences of S1 can be allocated to active carriers other than null carriers from among active carriers a(320) to a(383).

According to the interleaving method illustrated in FIG. 25, the apparatus for receiving broadcast signals may not decode specific signaling information affected by fading when frequency selective fading occurs due to multi-path interference and a fading period is concentrated on a region to which the specific signaling information is allocated.

Figure 26:
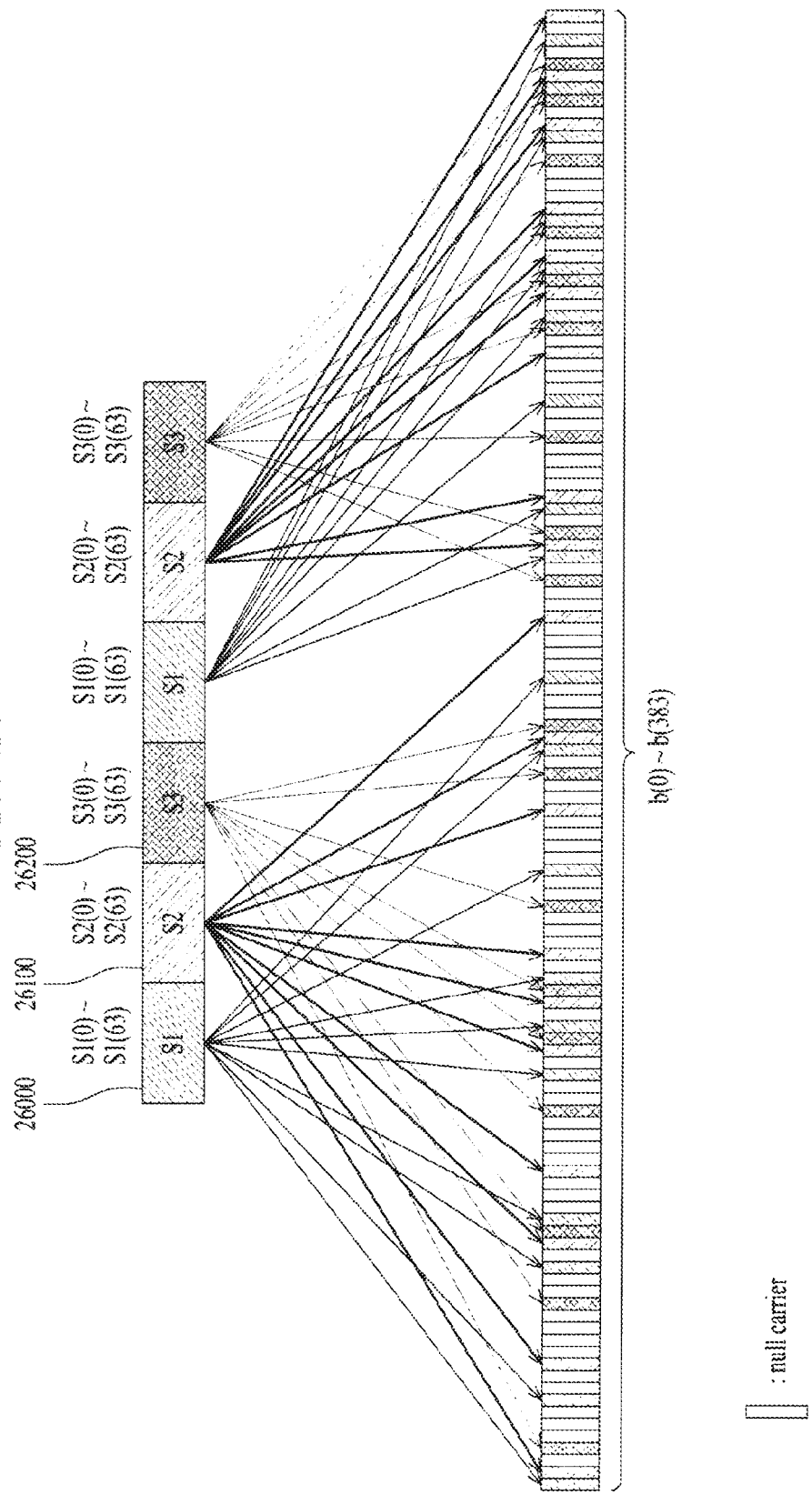
FIG. 26 illustrates a signaling information interleaving procedure according to another embodiment of the present invention.

FIG. 26 illustrates a signaling information interleaving procedure according to another embodiment of the present invention.

According to the signaling information interleaving procedure illustrated in FIG. 26, the signaling information carried by the preamble according to an embodiment of the present invention can be transmitted through bit sequences of S1, bit sequences of S2 and bit sequences of S3. The signalling data carried in the preamble is composed of 3 signalling fields, namely S1, S2 and S3.

As illustrated in FIG. 26, the bit sequences of S1, the bit sequences of S2 and the bit sequences of S3 according to an embodiment of the present invention are signaling sequences that can be allocated to active carriers to respectively carry signaling information (or signaling fields) included in the preamble.

Specifically, each of S1, S2 and S3 can carry 3-bit signaling information and can be configured in a structure in which a 64-bit sequence is repeated twice. Accordingly, 2-bit signaling information can be further transmitted compared to the embodiment illustrated in FIG. 25.

In addition, S1 and S2 can respectively carry the signaling information described in FIG. 25 and S3 can carry signaling information about a guard length (or guard interval length). Signaling information carried by S1, S2 and S3 can be changed according to design.

As illustrated in FIG. 26, bit sequences of S1, S2 and S3 can be represented as sequential numbers starting from 0, that is, S1(0), . . . . In the present embodiment of the invention, 384 carriers are present and are represented as sequential numbers starting from 0, that is, b(0), . . . . This can be modified by the designer.

As illustrated in FIG. 26, S1, S2 and S3 can be sequentially and repeatedly allocated to active carriers corresponding to predetermined positions in the frequency domain.

Specifically, bit sequences of S1, S2 and S3 can be sequentially allocated to active carriers other than null packets from among active carriers b(0) to b(383) according to Expression 4.

[Expression 4]

$b(n) = S1(n/3)$ when $n \bmod 3 = 0$ and $0 \leq n < 192$
$b(n) = S2((n-1)/3)$ when $n \bmod 3 = 1$ and $0 \leq n < 192$
$b(n) = S3((n-2)/3)$ when $n \bmod 3 = 2$ and $0 \leq n < 192$
$b(n) = S1((n-192)/3)$ when $n \bmod 3 = 0$ and $192 \leq n < 384$
$b(n) = S2((n-192-1)/3)$ when $n \bmod 3 = 1$ and $192 \leq n < 384$
$b(n) = S3((n-192-2)/3)$ when $n \bmod 3 = 2$ and $192 \leq n < 384$ According to the interleaving method illustrated in FIG. 26, it is possible to transmit a larger amount of signaling information than the interleaving method illustrated in FIG. 25. Furthermore, even if frequency selective fading occurs due to multi-path interference, the apparatus for receiving broadcast signals can uniformly decode signaling information since a fading period can be uniformly distributed in a region to which signaling information is allocated.

Figure 27:
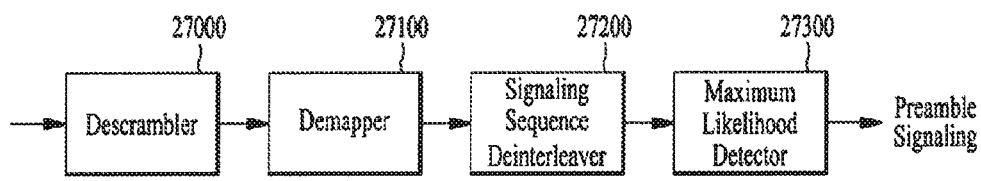
FIG. 27 illustrates a signaling decoder according to an embodiment of the present invention.

FIG. 27 illustrates a signaling decoder according to an embodiment of the present invention.

The signaling decoder illustrated in FIG. 27 corresponds to an embodiment of the signaling decoder illustrated in FIG. 20 and can include a descrambler 27000, a demapper 27100, a signaling sequence deinterleaver 27200 and a maximum likelihood detector 27300. A description will be given of operation of each block of the signaling decoder.

The descrambler 27000 can descramble a signal output from the data extractor. In this case, the descrambler 27000 can perform descrambling by multiplying the signal output from the data extractor by the scrambling sequence. The scrambling sequence according to an embodiment of the present invention can correspond to one of the sequences described with reference to FIGS. 22, 23 and 24.

The demapper 27100 can demap the signal output from the descrambler 27000 to output sequences having a soft value.

The signaling sequence deinterleaver 27200 can rearrange uniformly interleaved sequences as consecutive sequences in the original order by performing deinterleaving corresponding to a reverse process of the interleaving process described in FIGS. 25 and 26.

The maximum likelihood detector 27300 can decode preamble signaling information using the sequences output from the signaling sequence deinterleaver 27200.

Figure 28:
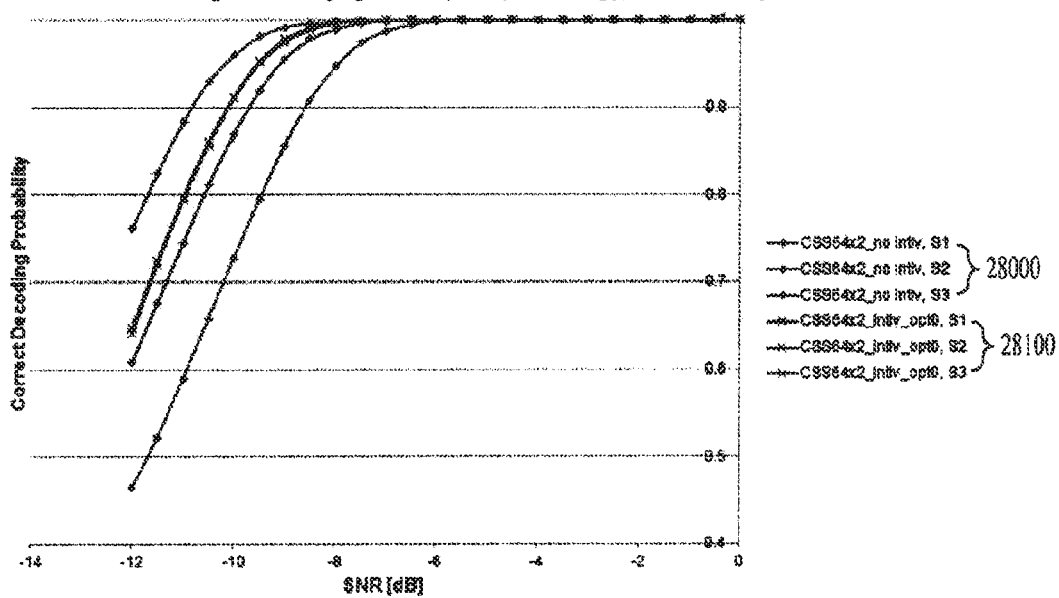
FIG. 28 is a graph showing the performance of the signaling decoder according to an embodiment of the present invention.

FIG. 28 is a graph showing the performance of the signaling decoder according to an embodiment of the present invention.

The graph of FIG. 28 shows the performance of the signaling decoder as the relationship between correct decoding probability and SNR in the case of perfect synchronization, 1 sample delay, 0 dB and 270 degree single ghost.

Specifically, first, second and third curves 28000 respectively show the decoding performance of the signaling decoder for S1, S2 and S3 when the interleaving method illustrated in FIG. 25 is employed, that is, S1, S2 and S3 are sequentially allocated to active carriers and transmitted. Fourth, fifth and sixth curves 28100 respectively show the decoding performance of the signaling decoder for S1, S2 and S3 when the interleaving method illustrated in FIG. 26 is employed, that is, S1, S2 and S3 are sequentially allocated to active carriers corresponding to predetermined positions in the frequency domain in a repeated manner and transmitted. Referring to FIG. 28, it can be known that there is a large difference between signaling decoding performance for a region considerably affected by fading and signaling decoding performance for a region that is not affected by fading when a signal processed according to the interleaving method illustrated in FIG. 25 is decoded. When a signal processed according to the interleaving method illustrated in FIG. 26 is decoded, however, uniform signaling decoding performance is achieved for S1, S2 and S3.

Figure 29:
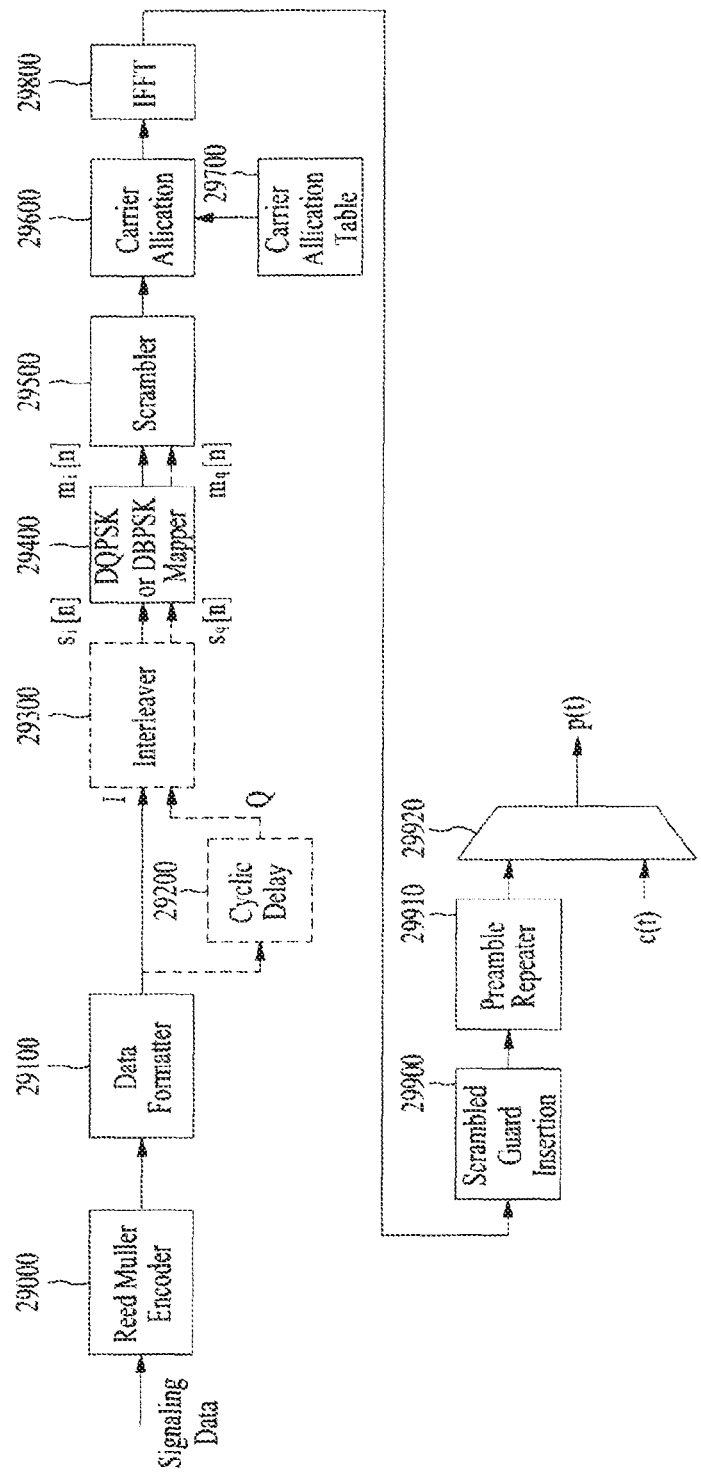
FIG. 29 illustrates a preamble insertion block according to another embodiment of the present invention.

FIG. 29 illustrates a preamble insertion block according to another embodiment of the present invention.

The preamble insertion block shown in FIG. 29 corresponds to another embodiment of the preamble insertion block 7500 illustrated in FIG. 11.

As shown in FIG. 29, the preamble insertion block can include a Reed Muller encoder 29000, a data formatter 29100, a cyclic delay block 29200, an interleaver 29300, a DQPSK (differential quadrature phase shift keying)/DBPSK (differential binary phase shift keying) mapper 29400, a scrambler 29500, a carrier allocation block 29600, a carrier allocation table block 29700, an IFFT block 29800, a scrambled guard insertion block 29900, a preamble repeater 29910 and a multiplexing block 29920. Each block may be modified or may not be included in the preamble insertion block according to design. A description will be given of operation of each block of the preamble insertion block.

The Reed Muller encoder 29000 can receive signaling information to be carried by the preamble and perform Reed Muller encoding on the signaling information. When Reed Muller encoding is performed, performance can be improved compared to signaling using an orthogonal sequence or signaling using the sequence described in FIG. 18.

The data formatter 29100 can receive bits of the signaling information on which Reed Muller encoding has been performed and format the bits to repeat and arrange the bits.

The DQPSK/DBPSK mapper 29400 can map the formatted bits of the signaling information according to DQPSK or DBPSK and output the mapped signaling information.

When the DQPSK/DBPSK mapper 29400 maps the formatted bits of the signaling information according to DBPSK, the operation of the cyclic delay block 29200 can be omitted. The interleaver 29300 can receive the formatted bits of the signaling information and perform frequency interleaving on the formatted bits of the signaling information to output interleaved data. In this case, the operation of the interleaver can be omitted according to design.

When the DQPSK/DBPSK mapper 29400 maps the formatted bits of the signaling information according to DQPSK, the data formatter 29100 can output the formatted bits of the signaling information to the interleaver 29300 through path I shown in FIG. 29.

The cyclic delay block 29200 can perform cyclic delay on the formatted bits of the signaling information output from the data formatter 29100 and then output the cyclic-delayed bits to the interleaver 29300 through path Q shown in FIG. 29. When cyclic Q-delay is performed, performance on a frequency selective fading channel is improved.

The interleaver 29300 can perform frequency interleaving on the signaling information received through paths I and Q and the cyclic Q-delayed signaling information to output interleaved information. In this case, the operation of the interleaver 29300 can be omitted according to design.

Expressions 5 and 6 represent the relationship between input information and output information or a mapping rule when the DQPSK/DBPSK mapper 29400 maps the signaling information input thereto according to DQPSK and DBPSK.

As shown in FIG. 29, the input information of the DQPSK/DBPSK mapper 29400 can be represented as $s_i[in]$ and $s_q[n]$ and the output information of the DQPSK/DBPSK mapper 29400 can be represented as $m_i[in]$ and $m_q[n]$.

[Expression 5]

$$\begin{aligned}
&m_i[-1] = 1, \\
&m_i[n] = m_i[n-1] \quad &&\text{if } s_i[n] = 0 \\
&m_i[n] = -m_i[n-1] \quad &&\text{if } s_i[n] = 1, \\
&m_q[n] = 0, \quad &&n = 0 - I, I: \text{\# of Reed} \\
& &&\text{Muller encoded signaling bits}
\end{aligned}$$

[Expression 6]

$$y[-1] = 0$$
$$y[n] = y[n-1] \quad \text{if } s_i[n] = 0 \text{ and } s_q[n] = 0$$
$$y[n] = (y[n-1] + 3) \bmod 4 \quad \text{if } s_i[n] = 0 \text{ and } s_q[n] = 1$$
$$y[n] = (y[n-1] + 1) \bmod 4 \quad \text{if } s_i[n] = 1 \text{ and } s_q[n] = 0$$
$$y[n] = (y[n-1] + 2) \bmod 4 \quad \text{if } s_i[n] = 1 \text{ and } s_q[n] = 1,$$
$$n = 0 - l, \, l: \text{\# of Reed Muller encoded signaling bits}$$
$$m_i[n] = 1/\sqrt{2} \; m_q[n] = 1/\sqrt{2} \quad \text{if } y[n] = 0$$
$$m_i[n] = -1/\sqrt{2} \; m_q[n] = 1/\sqrt{2} \quad \text{if } y[n] = 1$$
$$m_i[n] = -1/\sqrt{2} \; m_q[n] = -1/\sqrt{2} \quad \text{if } y[n] = 2$$
$$m_i[n] = 1/\sqrt{2} \; m_q[n] = -1/\sqrt{2} \quad \text{if } y[n] = 3, n = 0 - l, \, l: \text{\# of Reed Muller encoded signaling bits}$$

The scrambler 29500 can receive the mapped signaling information output from the DQPSK/DBPSK mapper 29400 and multiply the signaling information by the scrambling sequence.

The carrier allocation block 29600 can allocate the signaling information processed by the scrambler 29500 to predetermined carriers using position information output from the carrier allocation table block 29700.

The IFFT block 29800 can transform the carriers output from the carrier allocation block 29600 into an OFDM signal in the time domain.

The scrambled guard insertion block 29900 can insert a guard interval into the OFDM signal to generate a preamble. The guard interval according to one embodiment of the present invention can correspond to the guard interval in the scrambled cyclic prefix form described in FIG. 19 and can be generated according to the method described in FIG. 19.

The preamble repeater 29910 can repeatedly arrange the preamble in a signal frame. The preamble according to one embodiment of the present invention can have the preamble structure described in FIG. 19 and can be transmitted through one signal frame only once.

When the same preamble is repeated in one frame, the apparatus for receiving broadcast signals can stably detect the preamble even in the case of low SNR and decode the signaling information.

The multiplexing block 29920 can multiplex the signal output from the preamble repeater 29910 and the signal c(t) output from the guard sequence insertion block 7400 illustrated in FIG. 7 to output an output signal p(t). The output signal p(t) can be input to the waveform processing block 7600 described in FIG. 7.

Figure 30:
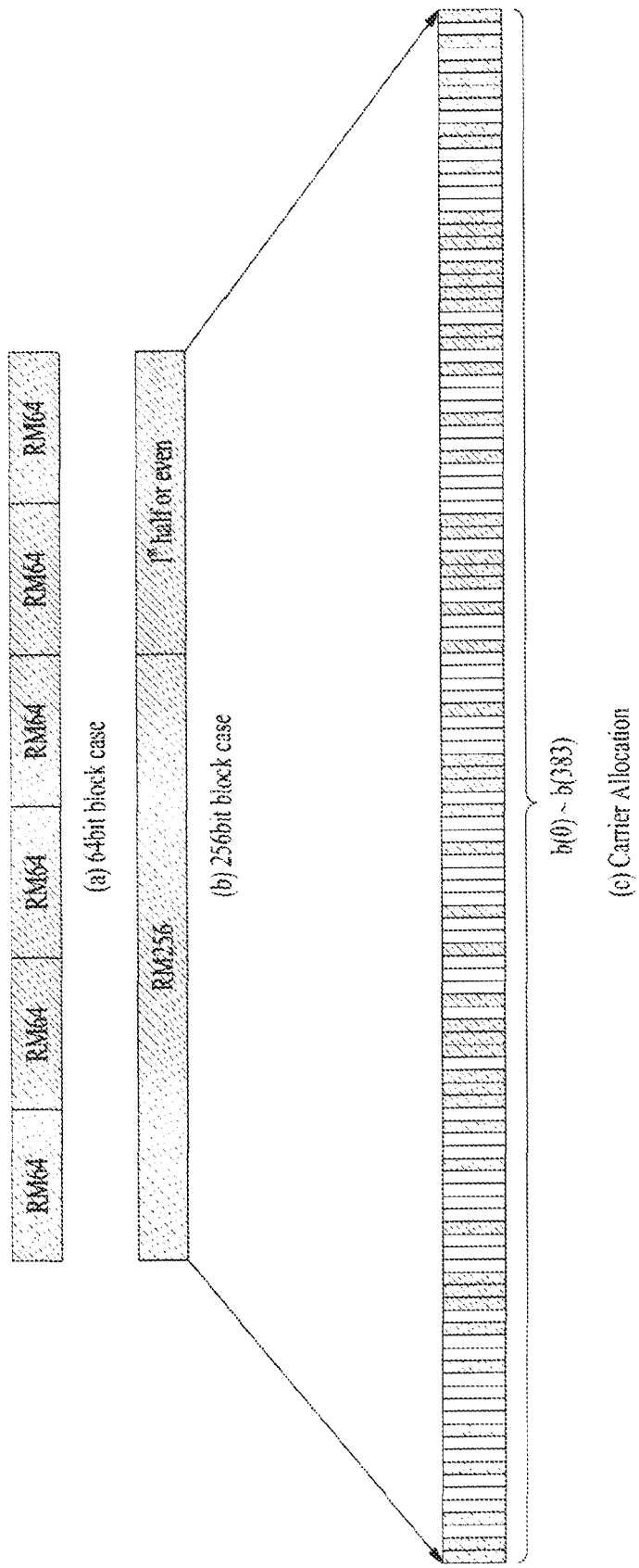
FIG. 30 illustrates a structure of signaling data in a preamble according to an embodiment of the present invention.

FIG. 30 illustrates a structure of signaling data in a preamble according to an embodiment of the present invention.

Specifically, FIG. 30 shows the structure of the signaling data carried on the preamble according to an embodiment of the present invention in the frequency domain.

As shown in FIG. 30, (a) and (b) illustrate an embodiment in which the data formatter 29100 described in FIG. 29 repeats or allocates data according to code block length of Reed Muller encoding performed by the Reed Muller encoder 29000.

The data formatter 29100 can repeat the signaling information output from the Reed Muller encoder 29000 such that the signaling information corresponds to the number of active carriers based on code block length or arrange the signaling information without repeating the same. (a) and (b) correspond to a case in which the number of active carriers is 384.

Accordingly, when the Reed Muller encoder 29000 performs Reed Muller encoding of a 64-bit block, as shown in (a), the data formatter 29100 can repeat the same data six times.

When the Reed Muller encoder 29000 performs Reed Muller encoding of a 256-bit block, as shown in (b), the data formatter 29100 can repeat former 128 bits or later 124 bits of the 256-bit code block or repeat 128 even-numbered bits or 124 odd-numbered bits.

As described above with reference to FIG. 29, the signaling information formatted by the data formatter 29100 can be processed by the cyclic delay block 29200 and the interleaver 29300 or mapped by the DQPSK/DBPSK mapper 29400 without being processed by the cyclic delay block 29200 and the interleaver 29300, scrambled by the scrambler 29500 and input to the carrier allocation block 29600.

As shown in FIG. 30, (c) illustrates a method of allocating the signaling information to active carriers in the carrier allocation block 29600 according to one embodiment. As shown in (c), b(n) represents carriers to which data is allocated and the number of carriers can be 384 in one embodiment of the present invention. Colored carriers from among the carriers shown in (c) refer to active carriers and uncolored carriers refer to null carriers. The positions of the active carriers illustrated in (c) can be changed according to design.

Figure 31:
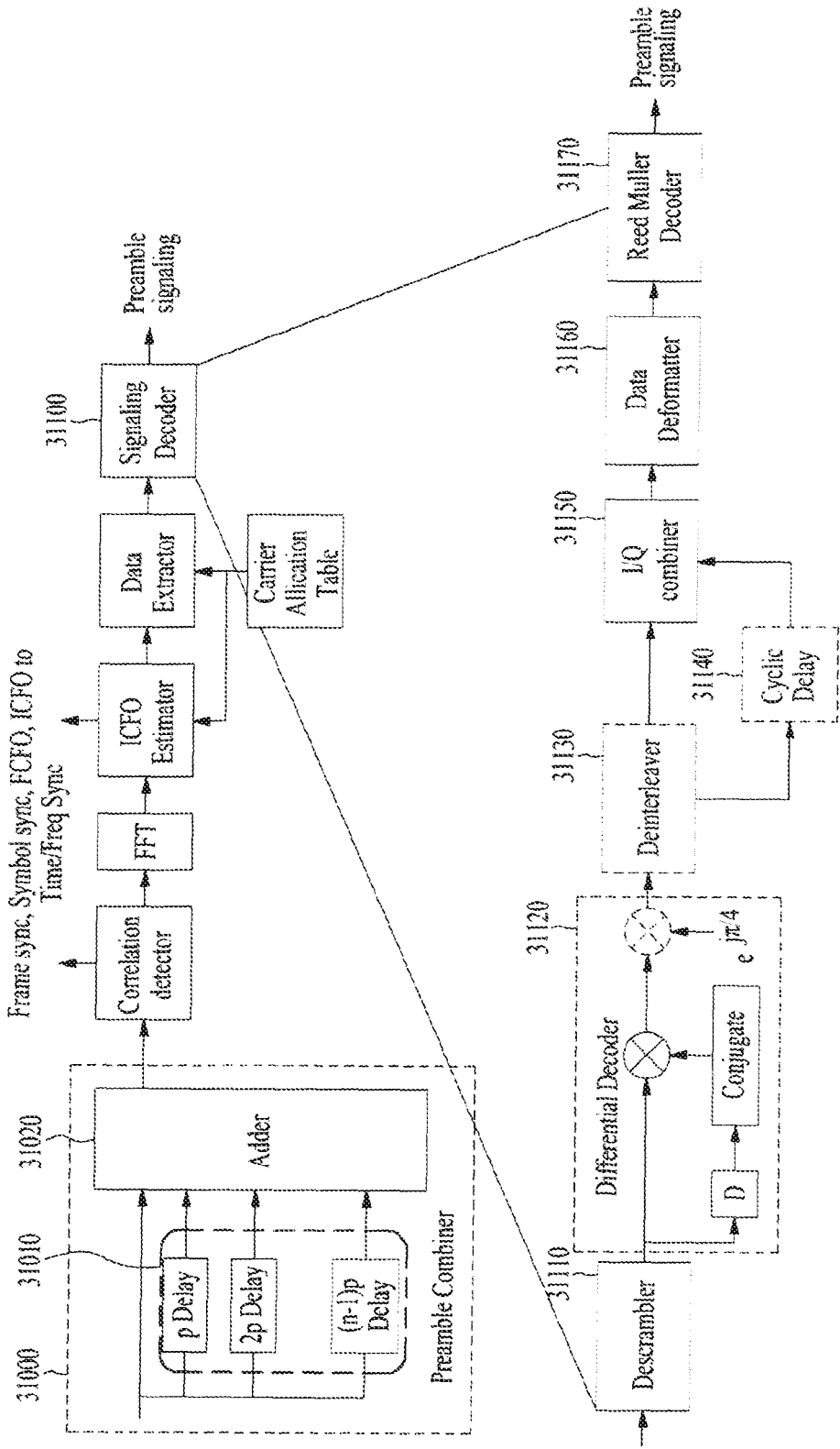
FIG. 31 illustrates a preamble detector according to another embodiment of the present invention.

FIG. 31 illustrates a preamble detector according to another embodiment of the present invention.

The preamble detector shown in FIG. 31 corresponds to another embodiment of the preamble detector 9300 described in FIGS. 9 and 20 and can perform operation corresponding to the preamble insertion block illustrated in FIG. 29.

As shown in FIG. 31, the preamble detector according to another embodiment of the present invention can include a correlation detector, an FFT block, an ICFO estimator, a carrier allocation table block, a data extractor and a signaling decoder 31100 in the same manner as the preamble detector described in FIG. 20. However, the preamble detector shown in FIG. 31 is distinguished from the preamble detector shown in FIG. 20 in that the preamble detector shown in FIG. 31 includes a preamble combiner 31000. Each block may be modified or omitted from the preamble detector according to design.

Description of the same blocks as those of the preamble detector illustrated in FIG. 20 is omitted and operations of the preamble combiner 31000 and signaling decoder 31100 are described.

The preamble combiner 31000 can include n delay blocks 31010 and an adder 31020. The preamble combiner 31000 can combine received signals to improve signal characteristics when the preamble repeater 29910 described in FIG. 29 repeatedly allocate the same preamble to one signal frame.

As shown in FIG. 31, the n delay blocks 31010 can delay each preamble by p*n−1 in order to combine repeated preambles. In this case, p represents a preamble length and n represents the number of repetitions.

The adder 31020 can combine the delayed preambles.

The signaling decoder 31100 corresponds to another embodiment of the signaling decoder illustrated in FIG. 27 and can perform reverse operations of the operations of the Reed Muller encoder 29000, data formatter 29100, cyclic delay block 29200, interleaver 29300, DQPSK/DBPSK mapper 29400 and scrambler 29500 included in the preamble insertion block illustrated in FIG. 29.

As shown in FIG. 31, the signaling decoder 31100 can include a descrambler 31110, a differential decoder 31120, a deinterleaver 31130, a cyclic delay block 31140, an I/Q combiner 31150, a data deformatter 31160 and a Reed Muller decoder 31170.

The descrambler 31110 can descramble a signal output from the data extractor.

The differential decoder 31120 can receive the descrambled signal and perform DBPSK or DQPSK demapping on the descrambled signal.

Specifically, when a signal on which DQPSK mapping has been performed in the apparatus for transmitting broadcast signals is received, the differential decoder 31120 can phase-rotate a differential-decoded signal by $\pi/4$. Accordingly, the differential decoded signal can be divided into in-phase and quadrature components.

If the apparatus for transmitting broadcast signals has performed interleaving, the deinterleaver 31130 can deinterleave the signal output from the differential decoder 31120.

If the apparatus for transmitting broadcast signals has performed cyclic delay, the cyclic delay block 31140 can perform a reverse process of cyclic delay.

The I/Q combiner 31150 can combine I and Q components of the deinterleaved or delayed signal.

If a signal on which DBPSK mapping has been performed in the apparatus for transmitting broadcast signals is received, the I/Q combiner 31150 can output only the I component of the deinterleaved signal.

The data deformatter 31160 can combine bits of signals output from the I/Q combiner 31150 to output signaling information. The Reed Muller decoder 31170 can decode the signaling information output from the data deformatter 31160.

Accordingly, the apparatus for receiving broadcast signals according to an embodiment of the present invention can acquire the signaling information carried by the preamble through the above-described procedure.

Figure 32:
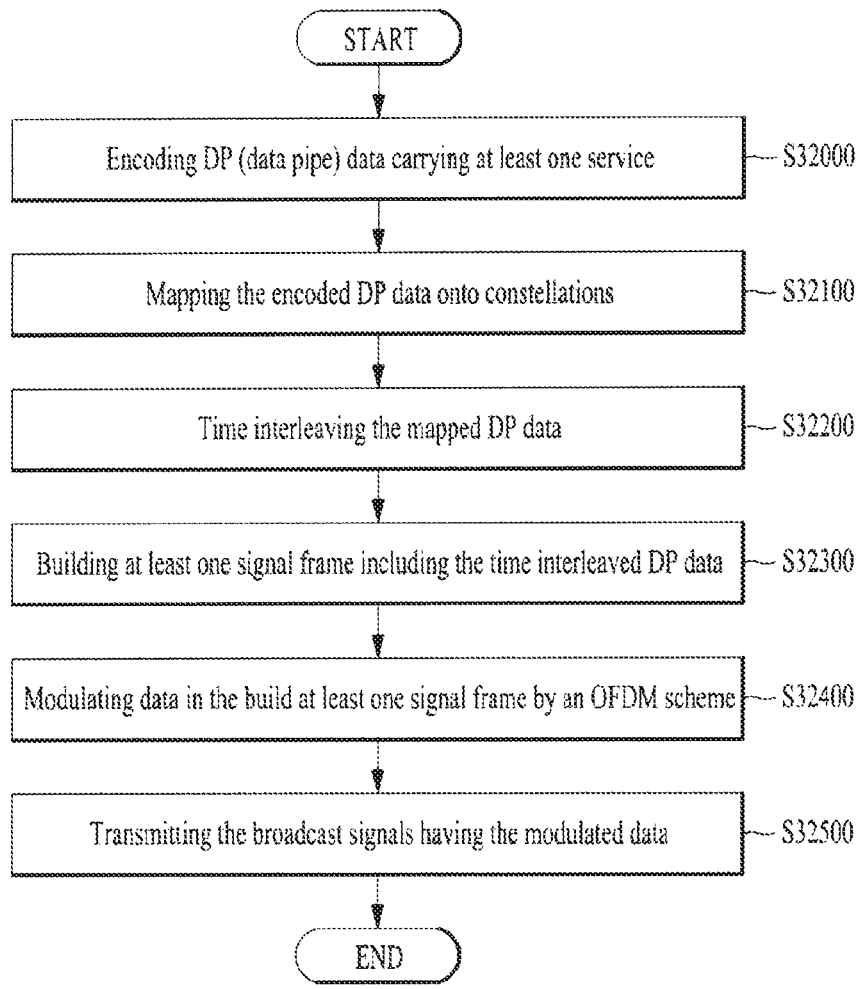
FIG. 32 is a flowchart illustrating a method for transmitting broadcast signals according to an embodiment of the present invention.

FIG. 32 is a flowchart illustrating a method for transmitting broadcast signals according to an embodiment of the present invention.

The apparatus for transmitting broadcast signals according to an embodiment of the present invention can encode DP (data pipe) data carrying at least one service (S32000). As described above, a data pipe is a logical channel in the physical layer that carries service data or related metadata, which may carry one or multiple service(s) or service component(s). Data carried on a data pipe can be referred to as DP data. The detailed process of step S32000 is as described in FIG. 1, 5 or 14.

The apparatus for transmitting broadcast signals according to an embodiment of the present invention can map the encoded DP data onto constellations (S32100). In addition, the apparatus for transmitting broadcast signals according to an embodiment of the present invention can perform MIMO processing on the mapped DP data. The detailed process of this step is as described in FIG. 1, 5 or 14.

Then, the apparatus for transmitting broadcast signals according to an embodiment of the present invention can time-interleave the mapped DP data (S32200). The detailed process of this step is as described in FIG. 1, 5 or 14.

Subsequently, the apparatus for transmitting broadcast signals according to an embodiment of the present invention can build at least on signal frame including the time-interleaved DP data (S32300). The detailed process of this step is as described in FIG. 1 or 6.

The apparatus for transmitting broadcast signals according to an embodiment of the present invention can modulate data included in the built at least one signal frame using an OFDM scheme (S32400). The detailed process of this step is as described in FIG. 1 or 7.

The apparatus for transmitting broadcast signals according to an embodiment of the present invention can transmit broadcast signals including the signal frame (S32500). The detailed process of this step is as described in FIG. 1 or 7.

As described above, the signal frame according to an embodiment of the present invention can include emergency alert system (EAS, or emergency alert message) information. In this case, the EAS information can be transmitted through a specific data pipe in the signal frame according to design.

In addition, the apparatus for transmitting broadcast signals according to an embodiment of the present invention can multiplex signals of different broadcast services on a frame-by-frame basis and transmit the same in the same RF channel. The different broadcast services may require different reception conditions or different coverages according to characteristics and purposes thereof. Accordingly, signal frames can be classified into types for transmitting data of different broadcast services and data included in the respective signal frames can be processed by different transmission parameters. Furthermore, the signal frames can have different FFT sizes and guard intervals according to broadcast services transmitted therethrough. In this case, the apparatus for transmitting broadcast signals according to an embodiment of the present invention can generate a preamble and insert the same in each signal frame, as described above. The preamble carriers basic PLS data and is located in the beginning of a frame. In addition, the preamble can carry PLS data described above with reference to FIG. 1. That is, the preamble can be considered to include both a symbol carrying the basic PLS data only and symbols carrying all PLS data described in FIG. 1, which can be modified by the designer.

Therefore, the apparatus for receiving broadcast signals according to an embodiment of the present invention can decode the preamble of each signal frame to identify the corresponding signal frame and acquire a desired broadcast service even when signal frames of different types, which are multiplexed in a super-frame, are received.

As described above with reference to FIG. 19, the preamble according to an embodiment of the present invention is a preamble signal in the time domain and can include a scrambled cyclic prefix part, that is, a guard interval and an OFDM symbol. The scrambled cyclic prefix part corresponds to a guard interval and can be generated by combining some or all OFDM symbols and a specific sequence. Details are as described in FIG. 19.

Figure 33:
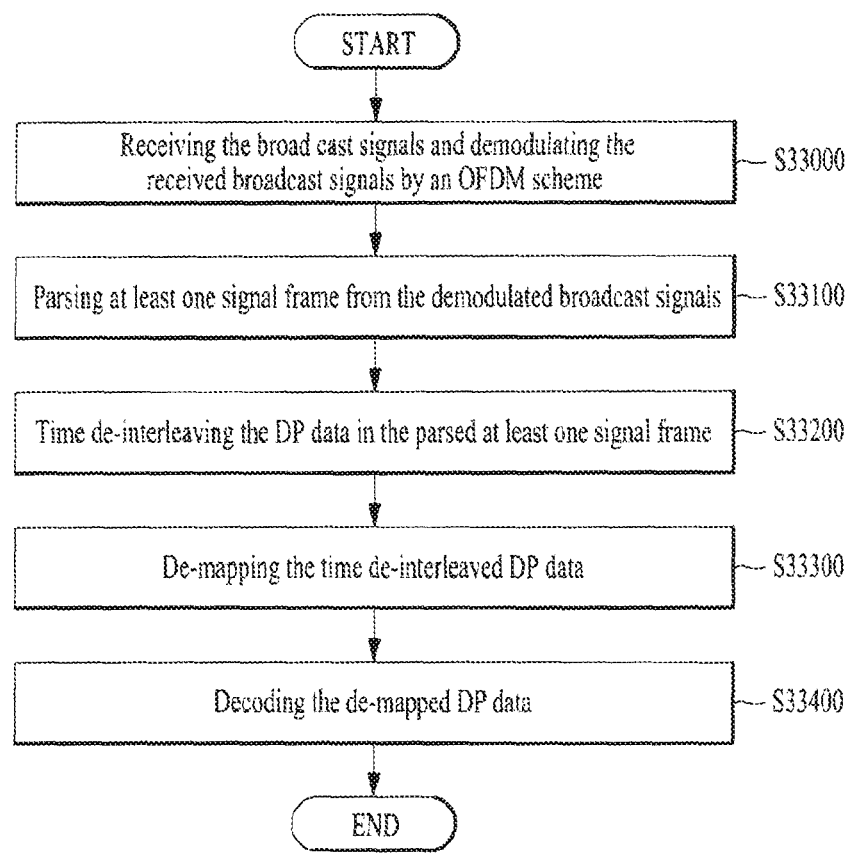
FIG. 33 is a flowchart illustrating a method for receiving broadcast signals according to an embodiment of the present invention.

FIG. 33 is a flowchart illustrating a method for receiving broadcast signals according to an embodiment of the present invention.

The flowchart shown in FIG. 33 corresponds to a reverse process of the broadcast signal transmission method according to an embodiment of the present invention, described with reference to FIG. 31.

The apparatus for receiving broadcast signals according to an embodiment of the present invention can receive the broadcast signals and demodulate the received broadcast signals using an OFDM scheme (S33000). Details are as described in FIG. 8 or 9.

The apparatus for receiving broadcast signals according to an embodiment of the present invention can parse at least one signal frame from the demodulated broadcast signals (S33100). Details are as described in FIG. 8 or 10. In this case, the at least one signal frame can include DP data for carrying services.

Subsequently, the apparatus for receiving broadcast signals according to an embodiment of the present invention can time-deinterleave the DP data included in the parsed at least one signal frame (S33200). Details are as described in FIG. 8 or 11 and FIG. 15.

Then, the apparatus for receiving broadcast signals according to an embodiment of the present invention can demap the time-deinterleaved DP data (S33300). Details are as described in FIG. 8 or 11 and FIG. 15.

The apparatus for receiving broadcast signals according to an embodiment of the present invention can decode the demapped DP data (S33400). Details are as described in FIG. 8 or 11 and FIG. 15.

As described above, the signal frame according to an embodiment of the present invention can include EAS information. In this case, the EAS information can be transmitted through a specific data pipe included in the signal frame according to the designer. Accordingly, the apparatus for receiving broadcast signals according to an embodiment of the present invention can obtain the EAS information transmitted through the signal frame as necessary.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for transmitting broadcast signals, the method comprising:
    encoding Data Pipe (DP) data carrying at least one service;
    bit interleaving the encoded DP data;
    mapping the bit interleaved DP data onto constellations;
    time interleaving the mapped DP data;
    building at least one signal frame including the time interleaved DP data;
    modulating data in the built at least one signal frame by an
    Orthogonal Frequency Division Multiplex (OFDM) scheme;
    inserting a preamble to the built at least one signal frame, wherein the preamble is generated by selecting a signaling sequence corresponding to signaling information and multiplying the selected signaling sequence with a Zadoff-Chu sequence; and
    transmitting the broadcast signals having the modulated data and the preamble.

2. The method of claim 1, wherein the inserted preamble is located at a beginning of the at least one signal frame.

3. The method of claim 1, wherein the preamble includes a guard interval and wherein the preamble includes signaling information indicating a Fast Fourier Transform (FFT) size of a following symbol in the at least one signal frame.

4. The method of claim 1, wherein the method further includes:
    Multi-Input Multi-Output (MIMO) processing the mapped DP data.

5. An apparatus for transmitting broadcast signals, the apparatus comprising:
    an encoder to encode Data Pipe (DP) data carrying at least one service;
    a bit interleaver to bit interleave the encoded DP data
    a mapper to map the bit interleaved DP data onto constellations;
    a time interleaver to time interleave the mapped DP data;
    a frame builder to build at least one signal frame including the time interleaved DP data;
    a modulator to modulate data in the built at least one signal frame by an Orthogonal Frequency Division Multiplex (OFDM) scheme;
    a preamble inserter to insert a preamble to the built at least one signal frame, wherein the preamble is generated by selecting a signaling sequence corresponding to signaling information and multiplying the selected signaling sequence with a Zadoff-Chu sequence; and
    a transmitter to transmit the broadcast signals having the modulated data and the preamble.

6. The apparatus of claim 5, wherein the inserted preamble is located at a beginning of the at least one signal frame.

7. The apparatus of claim 5, wherein the preamble includes a guard interval and wherein the preamble includes signaling information indicating a Fast Fourier Transform (FFT) size of a following symbol in the at least one signal frame.

8. The apparatus of claim 5, wherein the apparatus further includes:
    a Multi-Input Multi-Output (MIMO) processor to MIMO (Multi-Input Multi-Output) process the mapped DP data.

* * * * *